US011893375B2

(12) United States Patent
Paravatha et al.

(10) Patent No.: US 11,893,375 B2
(45) Date of Patent: Feb. 6, 2024

(54) CONFIGURABLE DEPLOYMENT OF DATA SCIENCE ENVIRONMENTS

(71) Applicant: Discover Financial Services, Riverwoods, IL (US)

(72) Inventors: Prasad Paravatha, Chicago, IL (US); Abdul Nafeez Mohammad, Chicago, IL (US)

(73) Assignee: Discover Financial Services, Riverwoods, IL (US)

( * ) Notice: Subject to any disclaimer, the term of this patent is extended or adjusted under 35 U.S.C. 154(b) by 101 days.

(21) Appl. No.: 17/580,264

(22) Filed: Jan. 20, 2022

(65) Prior Publication Data

US 2023/0229420 A1 Jul. 20, 2023

(51) Int. Cl.
*G06F 8/65* (2018.01)
*G06F 9/50* (2006.01)

(52) U.S. Cl.
CPC .............. *G06F 8/65* (2013.01); *G06F 9/5055* (2013.01)

(58) Field of Classification Search
USPC ........................................................ 717/169
See application file for complete search history.

(56) References Cited

U.S. PATENT DOCUMENTS

| 9,710,767 | B1 | 7/2017 | Dietrich et al. | |
| 2016/0148115 | A1* | 5/2016 | Sirosh | G06N 20/00 706/11 |
| 2016/0232457 | A1 | 8/2016 | Gray et al. | |
| 2017/0177309 | A1* | 6/2017 | Bar-Or | G06F 8/35 |
| 2017/0315791 | A1* | 11/2017 | Mascaro | G06F 8/36 |
| 2018/0004784 | A1* | 1/2018 | Tompkins | G06F 16/22 |
| 2018/0174056 | A1* | 6/2018 | Madison | G06Q 10/06375 |
| 2018/0357654 | A1* | 12/2018 | Huang | G06Q 30/0202 |
| 2019/0042068 | A1 | 2/2019 | Tompkins | |

(Continued)

OTHER PUBLICATIONS

International Searching Authority. International Search Report and Written Opinion issued in International Application No. PCT/US2022/053127, dated Apr. 28, 2023, 10 pages.

(Continued)

*Primary Examiner* — Qing Chen
*Assistant Examiner* — Clint Thatcher
(74) *Attorney, Agent, or Firm* — Lee Sullivan Shea & Smith LLP

(57) ABSTRACT

An example computing platform is configured to (i) cause a client device to display an interface for deploying a new data science environment, where the interface presents (a) a list of data science applications and (b) a set of user-defined configuration parameters, (ii) receive, from the client device, data indicating (a) a user selection of a given data science application from the list and (b) a user selection of one or more user-defined configuration parameters from the set, (iii) based on the user selection of the given data science application, determine a deployment template for use in deploying the new data science environment, the deployment template specifying (a) an executable environment package and (b) a set of predefined configuration parameters, and (iv) use the given executable environment package, the set of predefined configuration parameters, and the one or more user-defined configuration parameters to deploy the new data science environment.

20 Claims, 7 Drawing Sheets

(56) References Cited

U.S. PATENT DOCUMENTS

| | | | |
|---|---|---|---|
| 2020/0117434 A1* | 4/2020 | Biskup | G06F 9/445 |
| 2020/0364606 A1* | 11/2020 | Sawant | G06F 16/1873 |
| 2021/0034581 A1 | 2/2021 | Boven et al. | |
| 2021/0342725 A1 | 11/2021 | Marsden et al. | |
| 2022/0043978 A1* | 2/2022 | Wang | G06F 40/289 |

OTHER PUBLICATIONS

Harris et al. Digital transformation at Discover using AWS Storage. AWS Storage Blog. Apr. 22, 2020, 7 pages [online], [retrieved online Apr. 7, 2022].Retrieved from the Internet <URL: https://aws.amazon.com/blogs/storage/digital-transformation-at-discover-using-aws-storage-solutions/>.

Discover Accelerates Analytics and Time-to-Insights Using AWS. Discover. 2020, 8 pages [online], [retrieved online Apr. 7, 2022]. Retrieved from the Internet <URL: https://aws.amazon.com/solutions/case-studies/discover-financial-services-case-study/>.

Oppenheim et al. AWS re: Invent AIM 204-S. Discovering the value of a cloud data platform. 2019, 15 pages [online], [retrieved online Apr. 7, 2022]. Retrieved from the Internet: <URL: https://d1.awsstatic.com/events/reinvent/2019/Discovering_the_value_of_a_cloud_data_platform_AIM204-S.pdf>.

Harris et al. Air9 Analytics Environment. Discover. 2019, 21 pages [online], [retrieved online Apr. 7, 2022]. Retrieved from the internet <URL:https://cloud.redhat.com/hubfs/Discover-OpenShift-Commons-Oct28-Final.pdf>.

* cited by examiner

CONFIGURABLE DEPLOYMENT OF DATA SCIENCE ENVIRONMENTS

BACKGROUND

An increasing number of technology areas are becoming driven by data and the analysis of such data to develop insights. One way to do this is with data science models that may be created based on historical data and then applied to new data to derive insights such as predictions of future outcomes.

OVERVIEW

Disclosed herein is new technology that facilitates the streamlined setup and deployment of data science environments for multiple different data science applications through the use of predefined, user-selectable templates and corresponding configuration data.

In one aspect, the disclosed technology may take the form of a method to be carried out by a computing platform that involves (a) causing a client device associated with a user to display an interface for deploying a new data science environment, wherein the interface presents the user with (i) a list of data science applications and (ii) a set of user-defined configuration parameters corresponding to at least one data science application in the list, (b) receiving, from the client device, data indicating (i) a user selection of a given data science application from the list and (ii) a user selection of one or more user-defined configuration parameters from the set of user-defined configuration parameters, (c) based at least on the received data indicating the user selection of the given data science application, determining a deployment template for use in deploying the new data science environment, wherein the deployment template comprises data specifying (i) an executable environment package and (ii) a set of predefined configuration parameters for use in deploying the new data science environment, and (d) using the executable environment package, the set of predefined configuration parameters, and the one or more user-defined configuration parameters to deploy the new data science environment.

In some example embodiments, the one or more user-defined configuration parameters may include a computing resource allocation to use for deploying the new data science environment.

Further, in example embodiments, the method may include determining a set of user permissions assigned to the user, wherein the list of data science applications that is presented to the user is defined based on the set of user permissions assigned to the user.

Further yet, in example embodiments, the user may be associated with a set of user access credentials, and using the given executable environment package, the set of predefined configuration parameters, and the one or more user-defined configuration parameters to deploy the new data science environment may involve deploying the new data science environment such that the set of user access credentials is required to access the new data science environment.

Still further, in some example embodiments, the method may include tracking a deployment status of the new data science environment and, while tracking the deployment status of the new data science environment, causing an indication of the deployment status of the new data science environment to be displayed at the client device. In this regard, tracking the deployment status of the new data science environment may involve monitoring a lifecycle policy of the new data science environment.

Still further, in some example embodiments, the method may involve, based on a lifecycle policy for the new data science environment, automatically terminating the new data science environment.

Still further, in some example embodiments, the executable environment package comprises (i) executable program code for the given version of the data science application and (ii) one or more data objects that facilitate deployment of the new data science environment using the given version of the given data science application.

In yet another aspect, disclosed herein is a computing platform that includes a network interface for communicating over at least one data network, at least one processor, at least one non-transitory computer-readable medium, and program instructions stored on the at least one non-transitory computer-readable medium that are executable by the at least one processor to cause the computing platform to carry out the functions disclosed herein, including but not limited to the functions of one or both of the foregoing methods.

In still another aspect, disclosed herein is a non-transitory computer-readable medium provisioned with program instructions that, when executed by at least one processor, cause a computing platform to carry out the functions disclosed herein, including but not limited to the functions of one or both of the foregoing methods.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Data Platform

Organizations in many different industries have begun to operate computing platforms that are configured to ingest, process, analyze, generate, store, and/or output data that is relevant to the businesses of those organizations, which are often referred to as "data platforms." For example, a financial institution may operate a data platform that is configured to ingest, process, analyze, generate, store, and/or output data related to the financial institution's customers and their financial accounts, such as financial transactions data (among other types of data that may be relevant to the financial institution's business). As another example, an organization interested in monitoring the state and/or operation of physical objects such as industrial machines, transport vehicles, and/or other Internet-of-Things (IoT) devices may operate a data platform that is configured to ingest, process, analyze, generate, store, and/or output data related to those physical objects of interest. As another example, a provider of a Software-as-a-Service (SaaS) application may operate a data platform that is configured to ingest, process, analyze, generate, store, and/or output data that is created in connection with that SaaS application. Many other examples are possible as well.

Figure 1:
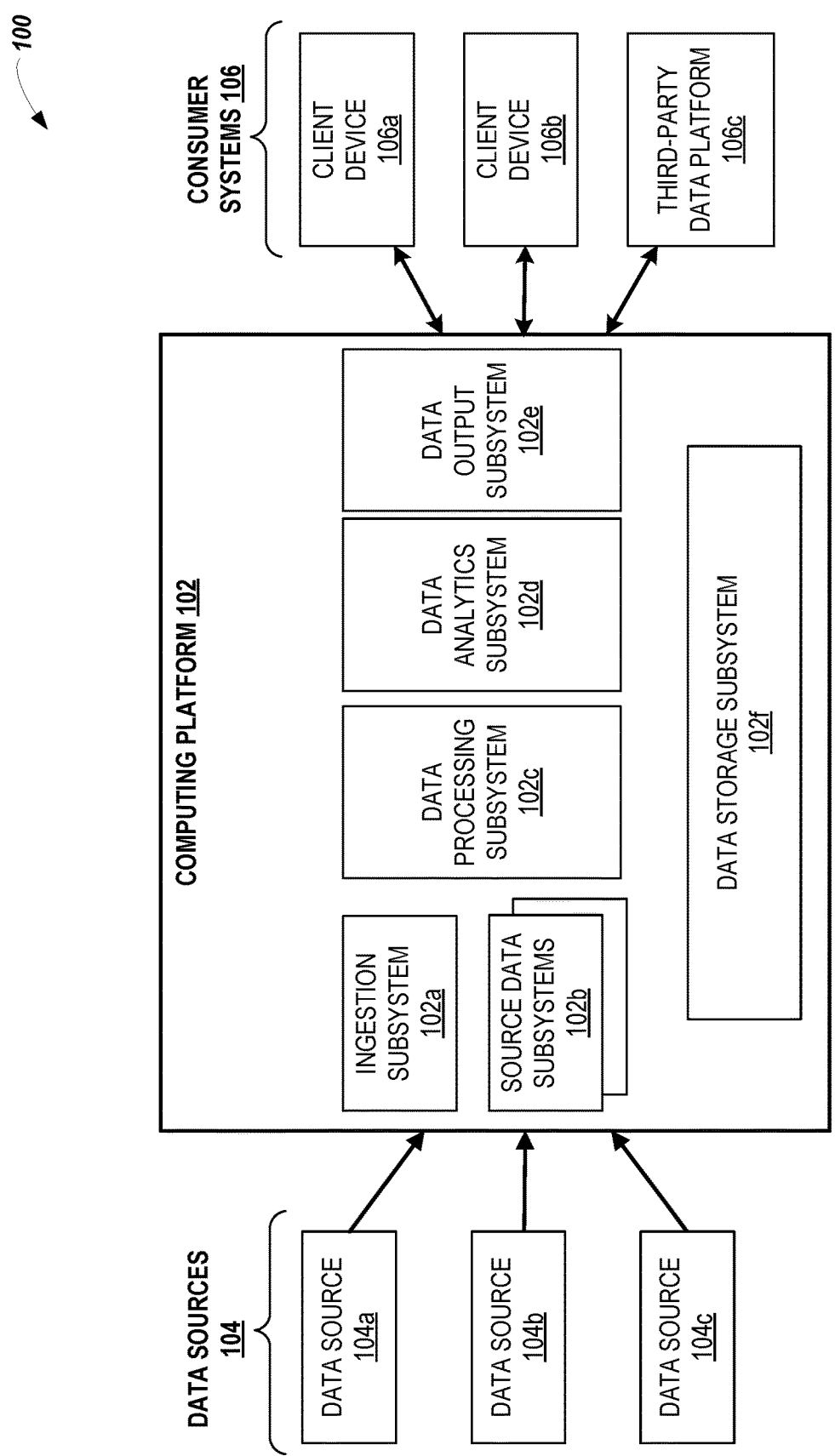
FIG. 1 is a schematic diagram of an example network environment in which a data platform may operate.

To illustrate with an example, FIG. 1 depicts a network environment 100 that includes at its core an example computing platform 102 that serves as a data platform for an organization, which may comprise a collection of functional subsystems that are each configured to perform certain functions in order to facilitate tasks such as data ingestion, data generation, data processing, data analytics, data storage, and/or data output. These functional subsystems may take various forms.

For instance, as shown in FIG. 1, the example computing platform 102 may comprise an ingestion subsystem 102a that is generally configured to ingest source data from a particular set of data sources 104, such as the three representative data sources 104a, 104b, and 104c shown in FIG. 1, over respective communication paths. These data sources 104 may take any of various forms, which may depend at least in part on the type of organization operating the example computing platform 102. For example, if the example computing platform 102 comprises a data platform operated by a financial institution, the data sources 104 may comprise computing devices and/or systems that generate and output data related to the financial institution's customers and their financial accounts, such as financial transactions data (e.g., purchase and/or sales data, payments data, etc.), customer identification data (e.g., name, address, social security number, etc.), customer interaction data (e.g., web-based interactions with the financial institution such as logins), and/or credit history data, among various other possibilities. In this respect, the data sources that generate and output such data may take the form of payment processors, merchant service provider systems such as payment gateways, point-of-sale (POS) terminals, automated teller machines (ATMs), computing systems at brick-and-mortar branches of the financial institution, and/or client devices of customers (e.g., personal computers, mobile phones, tablets, etc.), among various other possibilities. The data sources 104 may take various other forms as well.

Further, as shown in FIG. 1, the example computing platform 102 may comprise one or more source data subsystems 102b that are configured to internally generate and output source data that is consumed by the example computing platform 102. These source data subsystems 102b may take any of various forms, which may depend at least in part on the type of organization operating the example computing platform 102. For example, if the example computing platform 102 comprises a data platform operated by a financial institution, the one or more source data subsystems 102b may comprise functional subsystems that internally generate and output certain types of data related to customer accounts (e.g., account balance data, payment schedule data, etc.). The one or more source data subsystems 102b may take various other forms as well.

Further yet, as shown in FIG. 1, the example computing platform 102 may comprise a data processing subsystem 102c that is configured to carry out certain types of processing operations on the source data. These processing operations could take any of various forms, including but not limited to data preparation, transformation, and/or integration operations such as validation, cleansing, deduplication, filtering, aggregation, summarization, enrichment, restructuring, reformatting, translation, mapping, etc.

Still further, as shown in FIG. 1, the example computing platform 102 may comprise a data analytics subsystem 102d that is configured to carry out certain types of data analytics operations based on the processed data in order to derive insights, which may depend at least in part on the type of organization operating the example computing platform 102. For example, if the example computing platform 102 comprises a data platform operated by a financial institution, the data analytics subsystem 102d may be configured to carry out data analytics operations in order to derive certain types of insights that are relevant the financial institution's business, examples of which could include predictions of fraud or other suspicious activity on a customer's account and predictions of whether to extend credit to an existing or prospective customer, among other possibilities. The data analytics subsystem 102d may be configured to carry out any of numerous other types of data analytics operations as well.

Moreover, the data analytics operations carried out by the data analytics subsystem 102d may be embodied in any of various forms. As one possibility, a data analytics operation may be embodied in the form of a user-defined rule (or set of rules) that is applied to a particular subset of the processed data in order to derive insights from that processed data. As another possibility, a data analytics operation may be embodied in the form of a data science model that is applied to a particular subset of the processed data in order to derive insights from that processed data. In practice, such a data science model may comprise a machine learning model that has been created by applying one or more machine learning techniques to a set of training data, but data science models for performing data analytics operations could take other forms and be created in other manners as well. The data analytics operations carried out by the data analytics subsystem 102d may be embodied in other forms as well.

Referring again to FIG. 1, the example computing platform 102 may also comprise a data output subsystem 102e that is configured to output data (e.g., processed data and/or derived insights) to certain consumer systems 106 over respective communication paths. These consumer systems 106 may take any of various forms.

For instance, as one possibility, the data output subsystem 102e may be configured to output certain data to client devices that are running software applications for accessing and interacting with the example computing platform 102, such as the two representative client devices 106a and 106b shown in FIG. 1, each of which may take the form of a desktop computer, a laptop, a netbook, a tablet, a smartphone, or a personal digital assistant (PDA), among other possibilities. These client devices may be associated with any of various different types of users, examples of which may include individuals that work for or with the organization operating the example computing platform 102 (e.g., employees, contractors, etc.) and/or customers of the organization operating the example computing platform 102.

Further, the software applications for accessing and interacting with the example computing platform 102 that run on these client devices may take any of various forms, which may depend at least in part on the type of user and the type of organization operating the example computing platform 102. As another possibility, the data output subsystem 102e may also be configured to output certain data to other third-party data platforms, such as the representative third-party data platform 106c shown in FIG. 1.

In order to facilitate this functionality for outputting data to the consumer systems 106, the data output subsystem 102e may comprise one or more Application Programming Interface (APIs) that can be used to interact with and output certain data to the consumer systems 106 over a data network, and perhaps also an application service subsystem that is configured to drive the software applications running on the client devices, among other possibilities.

The data output subsystem 102e may be configured to output data to other types of consumer systems 106 as well.

Referring once more to FIG. 1, the example computing platform 102 may also comprise a data storage subsystem 102f that is configured to store all of the different data within the example computing platform 102, including but not limited to the source data, the processed data, and the derived insights. In practice, this data storage subsystem 102f may comprise several different data stores that are configured to store different categories of data. For instance, although not shown in FIG. 1, this data storage subsystem 102f may comprise one set of data stores for storing source data and another set of data stores for storing processed data and derived insights. However, the data storage subsystem 102f may be structured in various other manners as well. Further, the data stores within the data storage subsystem 102f could take any of various forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System or Amazon Elastic File System), object-based data stores (e.g., Amazon S3), data warehouses (which could be based on one or more of the foregoing types of data stores), data lakes (which could be based on one or more of the foregoing types of data stores), message queues, and/or streaming event queues, among other possibilities.

The example computing platform 102 may comprise various other functional subsystems and take various other forms as well.

In practice, the example computing platform 102 may generally comprise some set of physical computing resources (e.g., processors, data storage, etc.) that are utilized to implement the functional subsystems discussed herein. This set of physical computing resources take any of various forms. As one possibility, the computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the example computing platform 102 may comprise "on-premises" computing resources of the organization that operates the example computing platform 102 (e.g., organization-owned servers). As yet another possibility, the example computing platform 102 may comprise a combination of cloud computing resources and on-premises computing resources. Other implementations of the example computing platform 102 are possible as well.

Further, in practice, the functional subsystems of the example computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

As noted above, the example computing platform 102 may be configured to interact with the data sources 104 and consumer systems 106 over respective communication paths. Each of these communication paths may generally comprise one or more data networks and/or data links, which may take any of various forms. For instance, each respective communication path with the example computing platform 102 may include any one or more of point-to-point data links, Personal Area Networks (PANs), Local Area Networks (LANs), Wide Area Networks (WANs) such as the Internet or cellular networks, and/or cloud networks, among other possibilities. Further, the data networks and/or links that make up each respective communication path may be wireless, wired, or some combination thereof, and may carry data according to any of various different communication protocols. Although not shown, the respective communication paths may also include one or more intermediate systems, examples of which may include a data aggregation system and host server, among other possibilities. Many other configurations are also possible.

It should be understood that network environment 100 is one example of a network environment in which a data platform may be operated, and that numerous other examples of network environments, data platforms, data sources, and consumer systems are possible as well.

As noted above, one key aspect of most data platforms today is the use of data science models to carry out data analytics and derive insights based on data that is available within the data platform. Data science models may provide certain advantages over alternate forms of data analytics such as user-defined rules. For instance, unlike most user-defined rules, data science models are created through a data-driven process that involves analyzing and learning from historical data, and as a result, data science models are capable of deriving certain types of insights from data that are simply not possible with user-defined rules—including insights that are based on data-driven predictions of outcomes, behaviors, trends, or the like and insights that can only be revealed through an understanding of complex interrelationships between multiple different data variables. Further, unlike most user-defined rules, data science models are capable of being updated and improved over time through a data-driven process that re-evaluates model performance based on newly-available data and then adjusts the data science models accordingly. Further yet, data science models may be capable of deriving certain types of insights (e.g., complex insights) in a quicker and/or more efficient manner than other forms of data analytics such as user-defined rules. Depending on the nature of the available data and the types of insights that are desired, data science models may provide other advantages over alternate forms of data analytics as well.

However, before a data science model can be used by a data platform to carry out data analytics and derive insights based on data that is available within the data platform, that data science model first needs to be created through a data-driven process like the one mentioned above. Unfortunately, such a process for creating a data science model is typically a time-consuming, complex, and labor-intensive endeavor that involves many different stages and may require collaboration and input by multiple different professionals, including data scientists, developers, engineers, and/or data analysts.

For instance, a typical process for creating a data science model may begin with a first stage during which the initial dataset that is to be used for the creation of the data science model is selected and obtained. In practice, this initial dataset could either comprise data that is already available within the data platform (e.g., source data and/or processed data), data that is ingested from other data sources, or some combination thereof.

After the initial dataset is obtained, the process may proceed to a second stage during which processing operations similar to those described above are applied to the initial dataset in order to prepare that initial dataset for further analysis and use within the model creation process. In turn, the process typically proceeds to a third stage during which exploratory data analysis (EDA) is performed by one or more data scientists or data analysts in order to gain a better understanding of the dataset. This exploratory analysis may involve various tasks, including but not limited to reviewing and visualizing the initial dataset and performing feature engineering on the dataset in order to define which features to use for model training and what types of processing operations need to be performed on the source data in order to derive those features. Once the features are defined, the process may proceed to a fourth stage during which the dataset is processed in order to derive one or more feature datasets that are to be used during the process of building the data science model. For example, the initial dataset may be processed in order to derive a training dataset that is used for the initial training of the data science model, a validation dataset that may be used during the course of the training process to assist with certain aspects of that process, and/or a test dataset that may be used to test and evaluate the trained data science model, among other possibilities.

Next, the process may proceed to a fifth stage during which the dataset is used to build the data science model. At the beginning of this stage, data scientists or other professionals will select which one or more machine learning techniques are to be applied to the training dataset in order to train the data science model, and may also perform other configuration tasks such as selecting an initial set of hyperparameters for the data science model, among other possibilities. In turn, one or more machine learning techniques are applied to the training dataset in order to train the data science model. The one or more machine learning techniques that are applied could take any of various forms, examples of which may include a neural network technique (which is sometimes referred to as "deep learning"), a regression technique, a k-Nearest Neighbor (kNN) technique, a decision-tree technique, a support vector machines (SVM) technique, a Bayesian technique, an ensemble technique, a clustering technique, an association-rule-learning technique, a dimensionality reduction technique, an optimization technique such as gradient descent, a regularization technique, and/or a reinforcement technique, among other possible types of machine learning techniques. Further, in some implementations, this stage may involve training multiple different "candidate" models using different machine learning techniques and/or hyperparameters, which may then be evaluated and compared during the next stage in order to select which particular combination of machine learning technique(s) and hyperparameters are to be used for the data science model.

During the training stage, the validation dataset may also be used to assist with certain aspects of the training process for the data science model, such as selecting the hyperparameters and/or determining when to stop the training process (e.g., to avoid overfitting).

After the training stage, the process may proceed to a sixth stage during which the test dataset is used to evaluate the data science model (or the set of candidate models). This stage may involve inputting the test dataset into the one or more trained models and then evaluating and validating the performance of the one or more trained models by comparing each trained model's outputs to "ground truth" data included within the test dataset. Additionally, to the extent there are multiple candidate models that have been trained in the fifth stage, this stage may involve comparing the performance of those trained candidate models in order to select which trained candidate model to use as the data science model that is to be deployed.

Based on the evaluation performed during the sixth stage, the process may then proceed to a seventh stage during which the hyperparameters and/or features of the data science model are updated in an effort to further optimize (or at least improve) the performance of the trained data science model.

After the training and updating of the data science model has been completed, the process may optionally proceed to an eighth stage during which a data scientist or other professionals may define any additional processing operations that are to be performed on the output of the data science model in order to produce insights based on the model's output. Depending on the nature of the data science model, this stage could involve any of various tasks, including but not limited to setting a threshold that is to be applied to the model's output in order to translate that output into a Boolean data type (e.g., translating a likelihood value into a "yes" or "no" answer).

After the configuration of the data science model has been finalized, the process may proceed to a ninth stage during which the data science model is prepared and/or packaged up for deployment within the data platform. This may involve preparing and/or packaging up the trained data science model itself (which is sometimes referred to as a "model object" or a "model artifact"), configuration data related to the inputs and outputs of the data science model (e.g., configuration data that defines the specific source variables for the model, the specific feature variables for the model, the processing operations that are to be performed in order to derive the feature variables from the source variables, and any additional processing operations that are to be performed on the output of the data science model in order to produce insights based on the model's output), and any other configuration data that is needed to integrate the data science model into the production environment of the data platform (e.g., libraries or the like).

Once all of these steps have been completed, the data science model can then be deployed within the data platform so that it can be run on live data within the data platform, which may generally involve tasks for integrating the data science model into the production environment of the data platform. For instance, in the context of FIG. 1, the data science model may be deployed as part of the data analytics subsystem 102d of the computing platform 102. However, it should be understood that this is merely intended to serve as one illustrative example, and that the data science model could be deployed on any computing system that has sufficient computing resources to execute the data science model. Once the data science model is deployed within the data platform, it may then begin to receive input data and produce insights.

It should also be understood that the process of building a data science model could take various other forms as well—including but not limited to the possibility that certain ones of the stages discussed above could take different forms and/or take place in a different order. For example, instead of starting with one initial dataset and then using that one initial dataset to generate multiple different feature datasets during the fourth stage described above, it is possible that multiple different initial datasets could be defined and obtained as part of the first stage of the process, where each such initial dataset is then used to derive a corresponding feature dataset that is to be used for building the data science model (e.g., a first initial dataset for use in deriving a training dataset, a second initial dataset for use in deriving a validation dataset, a third initial dataset for use in deriving a test dataset, etc.). Other examples are possible as well.

Given the time-consuming, complex, and labor-intensive nature of the process for creating a data science model, there is a growing demand for software technology that can facilitate and accelerate the model creation process. To address this demand, some software providers have begun to offer software applications that can assist professionals such as data scientists, developers, engineers, and/or data analysts in performing certain tasks during the model creation process. These software applications may be referred to herein as "data science applications," and examples of these "data science applications" currently include JupyterHub, RStudio, SAS Studio, and H2O, among others. In practice, the way these data science applications typically work is that an instance of the application is launched and run on a given computing system, which could comprise a professional's local computer or a computing platform operated by the professional's organization. The data science application may then provide the professional with access to some set of functionality that facilitates the model creation process—including but not limited to functionality for loading a dataset, applying processing operations to the dataset, conducting EDA on the dataset, training a data science model based on the dataset, evaluating a trained data science model, and/or updating a trained data science model, among other possible functions. In this respect, a launched instance of one of these data science applications may be referred to herein as a "data science environment."

These data science applications may help to alleviate some of the challenges that are commonly faced by organizations and professionals when creating a data science model. For example, by using one or more of these data science applications, it is possible that certain stages of the model creation process could be carried out in a quicker, easier, and/or more efficient manner. As another example, these data science applications may enable a wider range of professionals to assist with the model creation process, because such applications may reduce or eliminate the lower-level coding that is required for certain stages of the model creation process. Other examples are possible as well.

However, these data science applications also have their own limitations and drawbacks and may give rise to new challenges. As an initial matter, each of these data science applications typically provides its own application-set of functionality, which may differ from application to application. As a result, organizations and professionals may need to utilize multiple different data science applications in order to cover the full range of functionality that is desired, either because a given application does not provide the full range of desired functionality or because different applications have different strengths and weaknesses with respect to their available functionalities and it is preferable to use one application for some tasks another application for other tasks. This presents a number of challenges, including but not limited to maintaining licenses and accounts for multiple different data science applications, learning and interacting with the different application-specific interfaces of these different data science applications, and transferring datasets, models, and other relevant information between multiple different data science applications.

Moreover, there are many limitations and drawbacks to the existing technology for deploying data science environments for these data science applications. For example, existing technology for deploying data science environments provides no ability for professionals of an organization to quickly and easily deploy data science environments for multiple different data science applications so that they can begin using those data science environments to create a data science model. As another example, existing technology for deploying data science environments provides no ability for professionals to input user-defined configuration parameters for a data science environment as part of the process of deploying the data science environment. As yet another example, existing technology for deploying data science environments provides limited or no ability to manage the deployment of a data science environment that is running within a computing platform—let alone manage deployments of multiple data science environments.

To address these and other shortcomings associated with existing data science applications for building data science models, disclosed herein is a new technology that facilitates the streamlined setup and deployment of data science environments for multiple different data science applications through the use of predefined, user-selectable templates and corresponding configuration data. This may significantly reduce the time and effort previously required for configuring and deploying data science environments for different data science applications, making it easier for users to quicky deploy one or more customized data science environments to suit their needs.

The new technology discussed herein may comprise a functional subsystem that is configured to host and drive a new software application for enabling users to configure and deploy data science environments for multiple different data science applications (e.g., in the form of containers or the like) and also to track and manage the data science environments that have been deployed. This new functional subsystem may be referred to herein as an "environment deployment subsystem."

In accordance with one aspect of the disclosed software application, the environment deployment subsystem may present a user (e.g., via a client device) with an interface that enables the user to select, from a set of available data science applications (such as H2O, RStudio, JupyterHub, Distributed H2O, Distributed Spark, SAS Studio, Driverless AI, etc.), a particular data science application for which to deploy a new data science environment. Additionally, the interface may also enable the user to define certain configuration parameters for the deployment of the new data science environment for the selected data science application, such as a particular version (e.g., release and/or pre-release versions) of the selected data science application for which to deploy the data science environment, a particular computing resource allocation for the deployed data science environment (e.g., size and/or configuration of the processor, memory, etc.), and/or a particular shared workspace to utilize for the deployed data science environment (e.g., a team folder or the like), among other possibilities. The environment deployment subsystem may then cause the new data science environment to be deployed according to the user's inputs—which may involve interaction with one or more other functional subsystems within a data platform.

To facilitate this functionality, the environment deployment subsystem may have access to a plurality of deployment templates for the available data science applications, where each deployment template corresponds to a respective data science application and defines a baseline environment configuration for each available version of the respective data science application. For instance, as one possible approach, the environment deployment subsystem may have access to a single deployment template for each respective data science application, where a first data science application's deployment template defines a baseline environment configuration for each available version of that first data science application (e.g., each available version of H2O), a second data science application's deployment template defines a baseline environment configuration for each available version of that second data science application (e.g., each available version of RStudio), and so on. In this respect, the selection of which deployment template to use for deploying a new data science environment may be based entirely on a user's selection of the particular data science application for which to deploy the new data science environment, and the other configuration parameters selected by the user (e.g., version, computing resource allocation, shared workspace, etc.) may then be applied to the selected deployment template in order to define the particular environment configuration that is to be deployed for the selected data science application. However, it should be understood that other implementations are possible as well.

As one alternate implementation, instead of having access to a single deployment template for a data science application that defines a baseline environment configuration for each available version of the data science application, the environment deployment subsystem could have access to multiple deployment templates for the data science application that each correspond to a different available version of the data science application. To illustrate with an example, if a given data science application has three available versions, then instead of having access to a single deployment template that defines a baseline environment configuration for each of these three available versions, the environment deployment subsystem could have access to three different deployment templates for given data science application—a first deployment template that defines a baseline configuration for the first version of the given data science application, a second deployment template that defines a baseline configuration for the second version of the given data science application, and a third deployment template that defines a baseline configuration for the third version of the given data science application. In this respect, the selection of which deployment template to use for deploying a new data science environment may be based on the user's selection of both the particular data science application and the particular version of the selected data science application, and the other configuration parameters selected by the user (e.g., computing resource allocation, shared workspace, etc.) may then be applied to the selected deployment template in order to define the particular environment configuration to deploy for the selected data science application.

As another alternate implementation, the environment deployment subsystem could have access to a pair of deployment templates for each respective data science application, where a first deployment template in the pair corresponds to a scenario where no shared workspace is to be utilized for the data science environment being deployed and a second deployment template in the pair corresponds to a scenario where a shared workspace is to be utilized for the data science environment being deployed. For example, such a pair of deployment templates for a given data science application may comprise (i) a first deployment template defines a baseline environment configuration for each available version of the given data science application in a scenario where no shared workspace is to be utilized for the data science environment being deployed and (ii) a second deployment template defines a baseline environment configuration for each available version of the given data science application in a scenario where a shared workspace is to be utilized for the data science environment being deployed. In this respect, the selection of which deployment template to use for deploying a new data science environment may be based on the user's selection of the particular data science application along with the user's selection of whether to use a shared workspace, and the other configuration parameters selected by the user (e.g., version, computing resource allocation, etc.) may then be applied to the selected deployment template in order to define the particular environment configuration to deploy for the selected data science application.

Various other implementations are possible as well, including but not limited to the possibility that other types of parameter-specific deployment templates could be utilized for a data science application as well.

At a high level, each deployment template for a given data science application may take the form of a data object (e.g., a .yaml file or blob, a json file or blob, etc.) comprising data that specifies one or more baseline environment configurations for the given data science application. For instance, in accordance with the present disclosure, a deployment template for a given data science application may comprise (i) one or more identifiers of the deployment template, (ii) data specifying one or more executable environment packages that form the basis for the one or more baseline environment configurations for the given data science application, and (iii) data specifying a set of pre-encoded configuration operations that are to be carried out when deploying a data science environment based on the one or more executable environment packages, among other possible information that may be included in the deployment template. Each of these aspects of the deployment template may take any of various forms.

To begin, the one or more identifiers of the deployment template may include any identifier that could be used by the environment deployment subsystem and/or the software application to identify the deployment template, which could take various forms. As one possible example, such an identifier may take the form of a name of the particular data science application to which the deployment template corresponds, which could be H2O, RStudio, JupyterHub, Distributed H2O (or "Dist-H2O" for short), Distributed Spark (or "Dist-Spark" for short), SAS Studio (or "SAS" for short), or Driverless AI (or "DAI" for short), among various other possibilities.

Further, the data within the deployment template that specifies the one or more executable environment packages may take the form an identifier for (and/or some other reference to) each of the one or more executable environment packages. In turn, each of the one or more executable environment packages, which may be stored separately from the deployment template, may take the form of a data structure (e.g., a container image, a .jar file, etc.) comprising executable program code for a given version of the given data science application as well as other objects that facilitate execution of a data science environment for the given version of the given data science application, such as config files, libraries, dependencies, environment variables, and/or runtimes, among other possibilities. To illustrate with an example, if a given data science application has three available versions, then the deployment template for the given data science application may include identifiers for three executable environment packages—a first executable environment package for the first version of the given data science application, a second executable environment package for the second version of the given data science application, and a third executable environment package for the third version of the given data science application. In this respect, the deployment template for the given data science application can be utilized to deploy a data science environment for each available version of the given data science application, and at the time of deployment, the environment deployment subsystem may determine which of the specified executable environment packages to utilize for the deployment based on the particular version of the given data science application that has been selected by the user. However, as noted above, other implementations are possible as well, including but not limited to the possibility that a separate deployment template may be maintained for each different version of a given data science application (in which case each deployment template would only specify a single executable environment package).

Further yet, the data within the deployment template that specifies the set of pre-encoded configuration operations to be carried out when deploying a new data science environment based on the one or more executable environment packages may generally comprise data specifying any of various operations that may need to be carried out in order to deploy a data science environment based on one or more executable environment packages—which may depend on the particular data science application for which the data science environment is to be deployed using the deployment template. As examples, these configuration operations could include pre-deployment operations, such as provisioning certain folders for the data science environment, as well as post-deployment operations, such as performing a Lightweight Directory Access Protocol (LDAP) binding operation and/or running certain post-deployment commands or scripts. Other examples are possible as well. In turn, the executable code for carrying out the set of pre-encoded configuration operations could be included within the one or more executable environment packages specified by the deployment template (e.g., the executable environment packages corresponding to the versions of the data science application) and/or could be included in one or more other executable packages that are accessible to the environment deployment subsystem (e.g., separate executable packages for performing configuration operations), among other possibilities.

In some implementations, in addition or in alternative to carrying out the set of pre-encoded configuration operations that are specified within the deployment template, the environment deployment subsystem may also be configured to carry out a set of global configuration operations when deploying a new data science environment, which may comprise configuration operations that are applicable to every executable environment package and are to be carried out in connection with every deployment of a new data science environment. To illustrate with an example, the environment deployment subsystem may be configured to perform an LDAP binding operation for every deployment of a new data science environment, in which case the LDAP binding operation could be implemented as a global configuration operation that is applicable to every executable environment package and is to be carried out by the environment deployment subsystem in a similar way regardless of which environment configuration is being deployed. In this respect, the LDAP binding operation may be abstracted out from the individual deployment templates, and the program code for carrying out the LDAP binding operation may be abstracted out from the executable environment packages such that the same program code can be used with multiple different executable environment packages. Many other examples are possible as well.

A deployment template for a given data science application could include various other data and/or take various other forms as well.

As noted above, at the time of deployment, a selected deployment template may then be combined with a set of user-defined configuration parameters in order to define the particular environment configuration for the new data science environment. This set of user-defined configuration parameters may take various forms, examples of which may include a particular version of the selected data science application for which to deploy the data science environment, a particular computing resource allocation to utilize for the deployed data science environment (e.g., size and/or configuration of the processor, memory, etc.), a shared workspace to utilize for the deployed data science environment (e.g., a team folder or the like), and/or a particular default run time to utilize for the deployed data science environment, among other possibilities.

In order to facilitate this functionality, the interface of the disclosed software application may present a user with options for certain user-definable configuration parameters that are to be utilized in conjunction with a given deployment template. In this respect, the configuration parameter options that are presented to a user may depend at least in part on the user's selection of the particular data science application for which a new data science application is to be deployed.

For instance, as one possibility, the interface of the disclosed software application may present a user with certain version options for the selected data science application and thereby enable the user to select one particular version of the selected data science application for which to deploy a new data science environment. In this regard, the version options that are presented to a user may depend on the particular data science application that has been selected by the user, perhaps among other factors (e.g., the user's permissions).

As another possibility, the interface of the disclosed software application may present a user with certain computing resource options (e.g., different processor/memory sizes and/or configuration) that are available for use in deploying a new data science environment by the deployment template and thereby enable the user to select one particular computer resource allocation to utilize when deploying a new data science environment. In this regard, the computing resource options that are presented to a user may depend at least in part on the requirements of the selected data science application, perhaps among other factors (e.g., the user's permissions). For example, if a data science environment for the selected data science application requires a minimum number of processor cores and/or a minimum RAM size, the computing resource options will not include options below these minimum values. Other examples are possible as well.

As yet another possibility, the interface of the disclosed software application may present a user with certain shared workspace options (e.g., team folders) that are available for use by a deployed data science environment for the selected data science application and thereby enable the user to select one particular shared workspace to utilize with the new data science environment—although the user may also be presented the option to select none of the available shared workspaces (in which case an individual workspace will be utilized).

As still another possibility, the interface of the disclosed software application may present a user with certain options related to the run time of the new data science environment, such as a selectable option for whether to use a longer default run time for the new data science environment.

The set of user-defined configuration parameters may take various other forms as well.

In accordance with the present disclosure, along with the set of user-defined configuration parameters that may be received at the time of deployment, each deployment template could also have a set of predefined configuration parameters corresponding to the deployment template that are to be utilized when deploying a new data science environment based on the deployment template. This set of predefined configuration parameters corresponding to the deployment template may be embodied in the form of a separate data object (e.g., a database record) that is correlated to the data object comprising the deployment template in some manner, such as by including an identifier of the data object comprising the configuration parameters within the data object comprising the deployment template and/or including an identifier of the data object comprising the deployment template within the data object comprising the configuration parameters, among other possibilities.

In general, a deployment template's corresponding set of predefined configuration parameters may include any configuration parameter that could be utilized during the process of deploying a data science environment based on the deployment template. For instance, as one possibility, a deployment template's corresponding set of predefined configuration parameters may include configuration parameters that can be utilized to integrate a deployed data science environment into the computing platform, such as configuration parameters for network connectivity (e.g., network policies) and/or configuration parameters for interacting with other functional subsystems within the computing platform (e.g., data stores, an LDAP subsystem, a simple mail transfer protocol (SMTP) subsystem, etc.). As another possibility, a deployment template's corresponding set of predefined configuration parameters may include certain configuration parameters that are to serve as inputs to the set of pre-encoded configuration operations specified in the deployment template (which could overlap to some extent with the configuration parameters for integrating a deployed data science environment into the computing platform). A deployment template's corresponding set of predefined configuration parameters may include various other types of configuration parameters as well. Further, it should be understood that, instead of being included as part of a separate set of predefined configuration parameters corresponding to a deployment template, some or all of these configuration parameters could be encoded within the deployment template itself.

In some implementations, in addition or in alternative to the sets of predefined configuration parameters that correspond to the deployment templates, the environment deployment subsystem may also have access to set of global configuration parameters that may be utilized when deploying a new data science environment, which may comprise configuration parameters that are applicable to every environment configuration and are to be utilized in connection with every deployment of a new data science environment. To illustrate with an example, certain configuration parameters for integrating a deployed data science environment into the computing platform (e.g., configuration parameters for integration with the LDAP and/or SMTP subsystems) may be applicable to every environment configuration regardless of which deployment template is used, in which case these configuration parameters could be implemented as global configuration parameters that are to be accessed and used by the environment deployment subsystem when deploying every new data science environment. In this respect, the global configuration parameters for integrating a deployed data science environment into the computing platform may be abstracted out from the individual sets of predefined configuration parameters. Many other examples are possible as well.

In accordance with the present disclosure, any of several different approaches may be utilized for maintaining the deployment templates and their corresponding sets of predefined configuration parameters. According to one such approach, the deployment templates may be maintained together with the back-end code for the disclosed software application in a code repository (e.g., a Git repository or the like), while the sets of predefined configuration parameters corresponding to the deployment templates may be stored in a database (e.g., a relational or NoSQL database) that is accessible by the environment deployment subsystem. For instance, the sets of predefined configuration parameters may be stored in a database along with identifiers that each indicate the particular deployment template to which the set of predefined configuration parameters corresponds. Storing the sets of predefined configuration parameters in this way may allow them to be updated independently from the deployment templates and the back-end code of the disclosed software application, which may facilitate more streamlined updates to the sets of predefined configuration parameters, as necessary.

According to another such approach, the deployment templates and the sets of predefined configuration parameters corresponding to deployment templates may both be stored in a database (e.g., a relational or NoSQL database) that is accessible by the environment deployment subsystem, where the deployment templates and predefined configuration parameters could be stored in the same database or different databases. In this respect, the deployment templates may be embodied in a format that is suitable for storage in a database, such as .yaml or .json files or blobs, among other possibilities. Similar to the benefits noted above with respect to configuration parameters, storing the deployment templates in a database as opposed to the code repository for the back-end code of the disclosed software application may facilitate more streamlined updates to the deployment templates. For instance, when the deployment templates are stored in conjunction with the back-end code of the disclosed software application, it may require a user to rebuild the executable file(s) that comprise the software application whenever a deployment template needs to be updated or added to the set of available deployment templates. This can be time consuming and burdensome in some situations, such as in an enterprise environment, where any code changes generally need to undergo a multi-step process that involves testing and validation before they are implemented. On the other hand, updating a database to store updated or additional deployment templates that are then accessible by the back-end code of the disclosed software application is likely to be less time consuming and burdensome than this process.

Other approaches for maintaining the deployment templates and their corresponding sets of predefined configuration parameters may be possible as well.

In turn, the executable environment packages may be maintained in a repository configured for storage of executable packages (e.g., a container registry), referred to herein as an "environment repository," which is separate from the repositories where the deployment templates and configuration parameters are maintained. In the examples discussed herein, the environment repository is generally accessed by the environment deployment subsystem after a user has requested deployment based on a given deployment template. Similar to the deployment templates and the configuration parameters, storage of the executable environment packages in a separate repository in this way may allow for executable environment packages to be added to or removed from the repository relatively easily. In other examples, the executable environment packages may be stored in other arrangements with respect to the deployment templates and configuration parameters. The data structures that are utilized to define and deploy environment configurations for data science applications in accordance with the disclosed technology may take various other forms as well.

In view of the above, it will be appreciated that there are numerous benefits associated with breaking down the information required to deploy data science environments into more modular pieces, such as the deployment templates, executable environment packages, and configuration parameters discussed herein. For example, much of the baseline configuration information that is required to deploy a data science environment using a given data science application may be the same regardless of the particular version of the data science application that is used, or the computing resources that are selected. Accordingly, separating this type of relatively fixed information and encoding it into a deployment template allows the baseline configuration information for the data science application to be assembled and organized once, after which it may be easily recalled and reused across numerous data science environment deployments for the given data science application.

Figure 2:
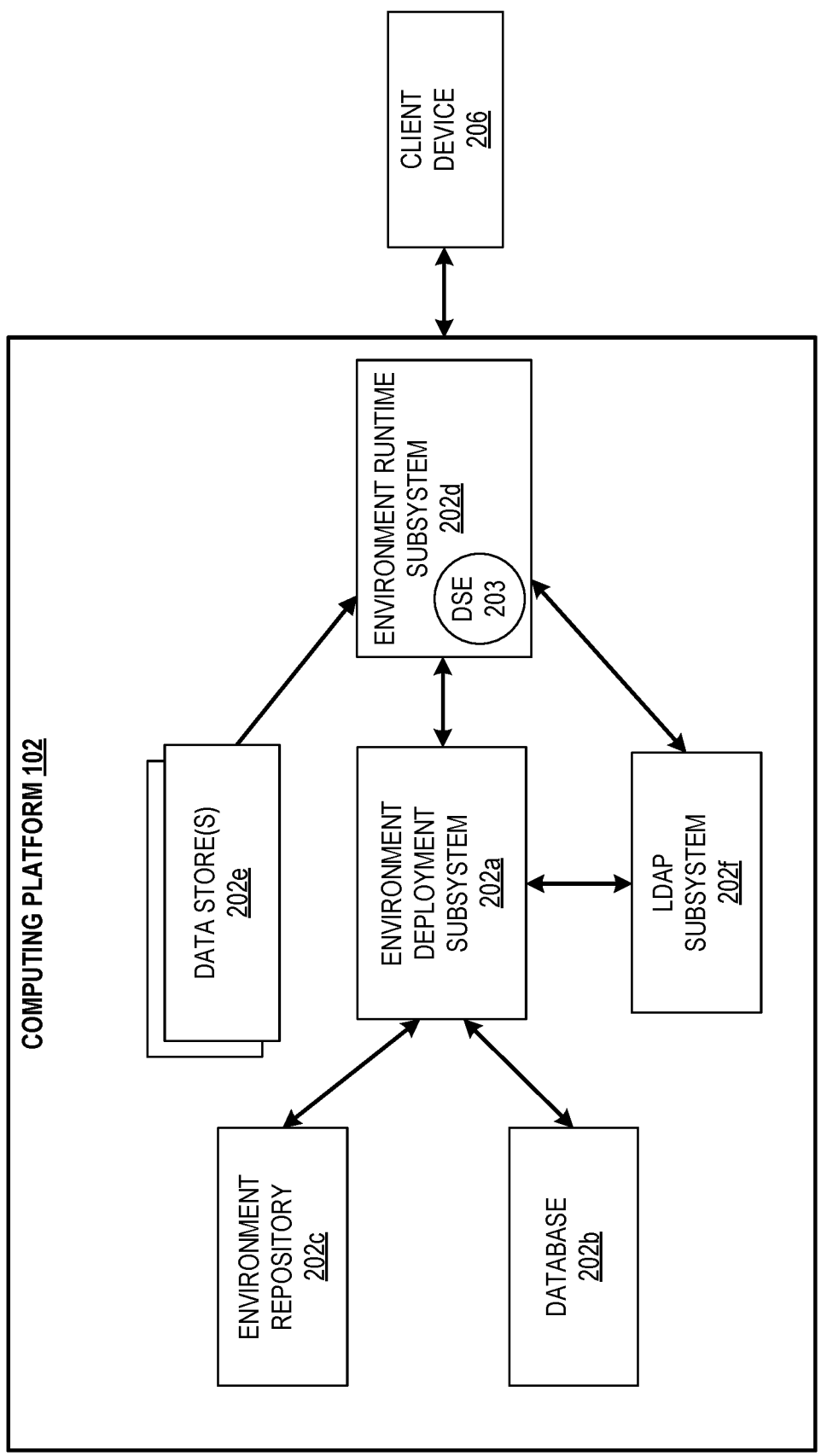
FIG. 2 depicts a simplified block diagram of example subsystems of a data platform that may facilitate the deployment of a data science environment.

As another benefit, separating the information that is specific to deploying each respective version of the given data science application into individual executable environment packages may allow for more efficient management of the individual versions. For example, if a new version of the given data science application is released, it may be incorporated by creating a new executable environment package that contains the executable program code for the new version, adding it to the environment repository, and then updating the deployment template(s) for the given data science application to include an additional identifier for the new executable environment package. Similarly, if a version of the given data science application is to be retired, the executable environment package corresponding to the retired version may be removed from the environment repository and the deployment template(s) for the given data science application may be updated to remove the identifier for the retired executable environment package. Turning now to FIG. 2, a block diagram is shown to illustrate various functional subsystems of a computing platform, such as the computing platform 102 of FIG. 1, that are each configured to perform certain operations to facilitate the configuration and deployment of data science environments in accordance with the disclosed technology. For instance, as shown in FIG. 2, the computing platform 102 may include an environment deployment subsystem 202a, a database 202b, an environment repository 202c, an environment runtime subsystem 202d, one or more data stores 202e, and a lightweight directory access protocol (LDAP) subsystem 202f, among other possibilities. In practice, it should be understood that some of the functional subsystems shown in FIG. 2 could be subsystems of the higher-level functional subsystems described and shown with reference to FIG. 1, while other of the functional subsystems shown in FIG. 2 could be separate from those higher-level functional subsystems. For example, the environment deployment subsystem 202a and/or the environment runtime subsystem 202d may be subsystems of the data analytics subsystem 102d of FIG. 1, and the database 202b, the environment repository 202c, and the one or more data stores 202e may be considered subsystems of the data storage subsystem 102f, while the LDAP subsystem 202f may be separate from the functional subsystems of FIG. 1. Other configurations are also possible.

In accordance with the present disclosure, the environment deployment subsystem 202a may host a new software application for deploying data science environments and managing deployed data science environments that may be accessible by a user via a client device, such as client device 206 shown in FIG. 2, which may be similar to one of the client devices 106a or 106b shown in FIG. 1. For instance, the disclosed software application may take the form of a web-based application that a user may access via a web browser on client device 206 or a mobile application that a user may launch on client device 206. Other implementations for the disclosed software application are also possible.

While hosting and running the disclosed software application, the environment deployment subsystem 202a may carry out various functions related to the configuration, deployment, and management of data science environment. These functions may take various forms.

To begin, the environment deployment subsystem 202a may function to provide an interface (e.g., a graphical user interface) that allows a user to make selections and configure certain aspects of a new data science environment for deployment. An example of such an interface that may be provided by the environment deployment subsystem 202a is discussed below in connection with FIG. 4A. In practice, a user may request access to this interface by logging in to the disclosed software application via the client device 206, and in response to determining that the user has been authenticated, the environment deployment subsystem 202a may cause the client device 206 to present the interface for configuring and deploying a new data science environment.

Additionally, the environment deployment subsystem 202a may carry out various other functions that enable the user to configure and deploy a new data science environment via the interface, which may make use of various services and associated APIs that are supported by environment deployment subsystem 202a. In practice, these APIs could be external APIs that are exposed publicly, in which case the calls to such APIs may originate from external entities as the client device 206, or these APIs could be internal APIs that facilitate internal communication between different functional components of the environment deployment subsystem 202a, in which case the calls to such APIs may originate from another functional component of the environment deployment subsystem 202a.

As one possibility, after receiving a request by a user to access the software application, the environment deployment subsystem 202a may function to retrieve a list of deployment templates that are available to the user (perhaps along with other data that defines the configuration options for the available deployment templates to the extent not included within the deployment templates themselves), and then based on the retrieved list of deployment templates, cause the software application to present the user with (i) a list of available data science applications that can be selected by the user in some manner and (ii) a set of configuration options that are available for a selected data science application and can be selected by the user in some manner (e.g., version options, computing resource allocation options, workspace options, etc.). This function may take various forms. For instance, in at least some implementations, this function may involve calling an API of a first service supported by the environment deployment subsystem 202a that is tasked with retrieving a list of deployment templates that are available to a user (perhaps along with other data that defines the configuration options for the available deployment templates to the extent not included within the deployment templates themselves) and then using that as a basis for determining the particular options to present to the user via the interface.

In this respect, the first service may function to retrieve a global list of available deployment templates in some manner (which may depend on whether the deployment templates are maintained within the code repository or the database 202b), and may also function to update the global list of available deployment templates based on permissions information for the user (which may involve interaction with the LDAP subsystem 202f). In turn, the first service may use the retrieved list of deployment templates (perhaps along with other data that defines the configuration options for the available deployment templates to the extent not included within the deployment templates themselves) as a basis for determining a list of data science applications that are available for selection by the user and then causing the interface of the software application to present that list of data science applications to the user along with available configuration options (e.g., version options, computing resource allocation options, workspace options, etc.) for whichever data science application is selected within the interface. Other examples are possible as well.

As another possibility, the environment deployment subsystem 202a may function to receive an indication that a user has requested deployment of a new data science environment for a given data science application selected by the user (e.g., H2O, RStudio, JupyterHub, Distributed H2O, Distributed Spark, SAS Studio, or Driverless AI) using certain user-defined configuration parameters (e.g., a given version, a given computing resource allocation, a given workspace option, etc.), and then based on that information, may select and retrieve a given deployment template for use in deploying the data science environment. This function may take various forms. For instance, in at least some implementations, this function may involve calling an API of a second service supported by the environment deployment subsystem 202a that is tasked with determining which deployment template to use for a requested deployment of a new data science environment and then retrieving that deployment template in some manner (which may depend on whether the deployment templates are maintained within the code repository or the database 202b).

In this respect, as discussed above, the function of determining which deployment template to use for a requested deployment of a new data science environment may take different forms depending on the nature of the deployment templates for the available data science applications. For example, if the environment deployment subsystem 202a has access to only one single application-specific deployment template for each respective data science application, the second service may be configured to determine which deployment template to use for a requested deployment of a new data science environment based solely on the given data science application that has been selected. As another example, if the environment deployment subsystem 202a has access to multiple, version-specific deployment templates for each respective data science application, the second service may be configured to determine which deployment template to use for a requested deployment of a new data science environment based on both the given data science application that has been selected and the version of the given data science application that has been selected. As yet another example, if the environment deployment subsystem 202a has access to a pair of deployment templates for each respective data science application that correspond to whether or not a shared workspace is to be utilized, the second service may be configured to determine which deployment template to use for a requested deployment of a new data science environment based on both the given data science application that has been selected and the workspace option that has been selected. Other examples are possible as well.

As yet another possibility, along with retrieving the given deployment template for use in deploying the data science environment, the environment deployment subsystem 202a may also retrieve any additional configuration parameters that are to be used in conjunction with the given deployment template in order to define the particular environment configuration for deployment, such as a set of predefined configuration parameters that correspond to the given deployment template and/or a set of global configuration parameters. This function may take various forms. For instance, in at least some implementations, the second service that is tasked with selecting and retrieving a deployment template to use for a requested deployment of a new data science environment may additionally be tasked with retrieving any additional configuration parameters to use for the requested deployment (e.g., from the database 202b), in which case this function may involve calling the API of the second service.

As still another possibility, the environment deployment subsystem 202a may function to deploy a new data science environment based on a given deployment template and a given set of configuration parameters, which may include a combination of user-defined configuration parameters (e.g., version, computing resource allocation, shared workspace, etc.) and additional configuration parameters that were retrieved along with the given deployment template (e.g., predefined configuration parameters corresponding to the given deployment template and/or global configuration parameters). This function may take various forms. For instance, in at least some implementations, this function may involve calling an API of a third service supported by the environment deployment subsystem 202a that is tasked with deploying a new data science environment based on a deployment template and a set of configuration parameters that is provided to the third service via its API (e.g., by the second service described above).

In this respect, the functions that are carried out by the third service in order to deploy a new data science environment may take various forms. As one possibility, the third service may determine which of the one or more executable environment packages specified in the given deployment template to use for the deployment of the new data science environment, which may depend on which version of the given data science application was selected, and may then retrieve that executable environment package (e.g., from the environment repository 202c). As another possibility, the third service may cause a certain allocation of computing resources to be provisioned for the deployment of the new data science environment. As yet another possibility, the third service may carry out any other pre-deployment configuration operations that are specified in the given deployment template (which could involve the use of certain of the configuration parameters). As still another possibility, the third service may apply certain of the configuration parameters to the retrieved executable environment package in order to create a deployed data science environment that can be executed by the environment runtime subsystem 202d (e.g., a container or virtual machine comprising the data science environment) and interact with other functional subsystems of the computing platform 102. As a further possibility, the third service may carry out any other post-deployment configuration operations that are specified in the given deployment template (which could involve the use of certain of the configuration parameters). The functions that are carried out by the third service in order to deploy a new data science environment may take other forms as well.

As a further possibility, after deploying a new data science environment, the environment deployment subsystem 202a may function to store certain metadata for the deployment in a database (e.g., the database 202b), such as a name of the deployment, a description of the deployment, and/or identification information for users that are to be notified about deployment status, among other possibilities. This function may take various forms, and in at least some implementations, this could be another function carried out by the third service.

The environment deployment subsystem 202a may carry out other functions that enable a user to configure and deploy a new data science environment as well.

Additionally yet, the environment deployment subsystem 202a may carry out various functions that enable a user to monitor and manage a deployed data science environment, which may also make use of various services and associated APIs that are supported by environment deployment subsystem 202a. As noted above, in practice, these APIs could be external APIs that are exposed publicly, in which case the calls to such APIs may originate from external entities as the client device 206, or could be internal APIs that facilitate internal communication between different functional components of the environment deployment subsystem 202a, in which case the calls to such APIs may originate from another functional component of the environment deployment subsystem 202a.

As one possibility, the environment deployment subsystem 202a may function to track the status of a deployed data science environment. This function may take various forms. For instance, in at least some implementations, this function may involve calling an API of a fourth service supported by the environment deployment subsystem 202a that is tasked with tracking status of each deployed data science environment. In this respect, the fourth service may function to interact with the environment runtime subsystem 202d to obtain status information for a deployed data science environment and then store the status information in a database (e.g., the database 202b). Such status information may take any of various forms, examples of which may include a current run status of the deployed data science environment (e.g., active, suspended, terminated, etc.), a total amount of run time of the deployed data science environment, a remaining amount of run time in the lifetime of the deployed data science environment, and an indication of recent usage activity of the deployed data science environment, among other possibilities.

As another possibility, while tracking the status of a deployed data science environment, the environment deployment subsystem 202a may function to cause status updates for the deployed data science environment to be provided to certain users (e.g., the user that initiated deployment of a data science environment and perhaps also other users that have been subscribed to status updates for a data science environment). This function may take various forms. For instance, in at least some implementations, the fourth service that is tasked with tracking the status of each deployed data science environment may additionally use the obtained status information for a deployed data science environment as a basis for causing status updates to be provided to users in the form of indications presented within the interface of the disclosed software application and/or emails, among other possibilities.

As yet another possibility, while tracking the status of a deployed data science environment, the environment deployment subsystem 202a may function to evaluate one or more lifecycle policies for the deployed data science environment. This function may take various forms. For instance, in some implementations, the fourth service that is tasked with tracking the status of each deployed data science environment may additionally use certain of the obtained status information for a deployed data science environment as a basis for evaluating a lifecycle policy governing whether to automatically suspend and/or terminate the deployed data science environment, and then if it is determined that such a lifecycle policy is satisfied, the fourth service may then call an API of another service supported by the environment deployment subsystem 202a that is tasked with suspending and/or terminating a deployed data science environment.

While tracking the status of the deployed data science environment, the environment deployment subsystem 202a may evaluate other types of lifecycle policies and/or perform other functions based on the status of the deployed data science environment as well.

As still another possibility, the environment deployment subsystem 202a may function to receive a communication indicating a user request to temporarily suspend a deployed data science environment and then cause the environment runtime subsystem 202d to temporarily suspend the deployed data science environment. This function may take various forms. For instance, in at least some implementations, this function may involve calling an API of a fifth service supported by the environment deployment subsystem 202a that is tasked with causing the environment runtime subsystem 202d to suspend a deployed data science environment. (Notably, this same service may also be called by the fourth service to automatically suspend a deployed data science environment in accordance with a lifecycle policy). In this respect, the fifth service may function to interact with the environment runtime subsystem 202d in a manner that causes the deployed data science environment to be scaled down and have its external access disabled, so as to temporarily suspend the deployed data science environment.

Correspondingly, the environment deployment subsystem 202a may function to receive a communication indicating a user request to resume a deployed data science environment that has previously been suspended and then cause the environment runtime subsystem 202d to resume the deployed data science environment. This function may take various forms. For instance, in at least some implementations, the fifth service that is tasked with causing the environment runtime subsystem 202d to suspend a deployed data science environment may also be tasked with causing the environment runtime subsystem 202d to resume a deployed data science environment that has previously been suspended, in which case this function may involve calling the API of the fifth service.

As yet a further possibility, the environment deployment subsystem 202a may function to cause the environment runtime subsystem 202d to terminate a deployed data science environment, such as when a lifecycle policy governing termination has been satisfied. This function may take various forms. For instance, in at least some implementations, this function may involve calling an API of a sixth service supported by the environment deployment subsystem 202a that is tasked with causing the environment runtime subsystem 202d to terminate a deployed data science environment. In this respect, the sixth service (which may be called by the fourth service described above) may function to interact with the environment runtime subsystem 202d in a manner that causes the deployed data science environment to be terminated.

The environment deployment subsystem 202a may take various other forms and perform various other functions as well.

The database 202b of FIG. 2 may be configured to store certain information that facilitates the configuration, deployment, monitoring, and management of data science environments. For instance, in line with the discussion above, the database 202b may contain configuration parameters corresponding to each of the deployment templates. Further, in at least some implementations, the database 202b may contain the templates themselves. Further yet, the database 202b may contain metadata for deployments of data science environments, which may be written to the database 202b by the environment deployment subsystem 202a as part of the process of deploying data science environments. Still further, the database 202b may contain status information related to the data science environments that are currently deployed within the environment runtime subsystem 202d, which may be written to the database 202b by the environment deployment subsystem 202a and/or some other functional subsystem of the computing platform 102 (e.g., the environment runtime subsystem 202d). The database 202b may store other types of information as well.

The environment repository 202c of FIG. 2 may be configured to store the executable environment packages referenced by the templates, which as noted above could take various forms, examples of which may include container images and/or .jar files, among other possibilities. The environment repository 202c may store other data objects as well.

The environment runtime subsystem 202d of FIG. 2 may be configured to execute the data science environments that have been deployed in the manner disclosed herein. In this respect, the environment runtime subsystem 202d could take the form of a runtime system for containers (e.g., a Kubernetes or Docker runtime system) or a runtime system for virtual machines, among various other possibilities. To illustrate with an example, a deployed data science environment ("DSE") 203 is shown to be executing within the environment runtime subsystem 202d. After the environment runtime subsystem 202d begins to run a deployed data science environment, such as the deployed data science environment 203, a user may then be able to access and use the data science environment to carry out any of various tasks related to building data science models.

While FIG. 2 shows one deployed data science environment 203 executing within the environment runtime subsystem 202d, it should also be understood that, in practice, the environment runtime subsystem 202d may simultaneously be executing multiple data science environments that have been deployed by a given user, or by multiple different users associated with an organization. In this respect, the environment runtime subsystem 202d may be configured to perform orchestration functions for the deployed data science environments.

The data science environments that are deployed in accordance with the present disclosure may also be configured to interact with various other functional subsystems of the computing platform 102 in order to facilitate the functionality for building data science models that is provided by the deployed data science environments.

For instance, as shown in FIG. 2, a deployed data science environment within the environment runtime subsystem 202d may be configured to interact with one or more data stores 202e of the computing platform 102 in order to (i) obtain input datasets for use in facilitating the functionality provided by the deployed data science environment for building a data science model (e.g., EDA, model training, model evaluation, the model updating, etc.) and/or (ii) store certain data generated by the data science environment. In this respect, the one or more data stores 202e may take any of various forms, including any one or more of the data store types discussed above with respect to the data storage subsystem 102f of the computing platform 102, among other possibilities. Further, the input datasets obtained from the one or more data stores 202e may take any of various forms, which may depend at least in part on the type of organization operating the computing platform 102 and the type of data science model that is to be built. For example, if the computing platform 102 is operated by a financial institution and the data science model to be built is one that functions to identify fraud or other suspicious activity, the input dataset obtained from the one or more data stores 202e may include customer transaction or financial account activity data. Various other types of input data, originating from any of various other sources, are also possible—including but not limited to the possibility that input data for the data science environment is obtained from functional subsystems of the computing platform 102 other than data stores of data storage subsystem (e.g., the ingestion or processing subsystem).

Further, as shown in FIG. 2, a deployed data science environment within the environment runtime subsystem 202d may be configured to interact with the LDAP subsystem 202f (or the like) that is responsible for facilitating user authentication and authorization operations within the computing platform 102. For instance, when a user attempts to access a deployed data science environment, the deployed data science environment may be configured interact with the LDAP subsystem 202f in order to determine whether the user has the appropriate permissions to access the deployed data science environment, among other possibilities.

Various other functional subsystems of the computing platform 102 may likewise interact with the LDAP subsystem 202f in order to perform user authentication and/or authorization operations. For instance, as shown in FIG. 2, when a user attempts to access the software application hosted by the environment deployment subsystem 202a, the environment deployment subsystem 202a may interact with the LDAP subsystem 202f in order to authenticate the user and perhaps also to determine which deployment templates and user-definable configuration parameters are available to the user.

A deployed data science environment within the environment runtime subsystem 202d could be configured to interact with other functional subsystems of the computing platform 102 as well, including but not limited to an SMTP subsystem.

In view of the above, it will be appreciated that one of the advantages created by the new technology disclosed herein is the ability for users to access a centralized interface (e.g., the software application hosted by the environment deployment subsystem 202a) through which the user may set up and deploy numerous different types of data science environments within a single data platform of an organization. For instance, a user might deploy multiple data science environments using different data science applications, and/ or multiple data science environments using the same data science application, but with different user-defined configuration parameters for each environment. As another advantage, the user is able to access each of the deployed data science environments through the same centralized interface in order to monitor and/or manage the deployments, as discussed further below in connection with FIG. 4A. As yet another advantage, each of the data science environments deployed by the user within the environment runtime subsystem 202d can all make use of the same universe of available data stores (e.g., the one or more data stores 202e) without having to do any special configuration or transferring of data from one platform to another. The new technology disclosed herein provides numerous other advantages as well.

Figure 3:
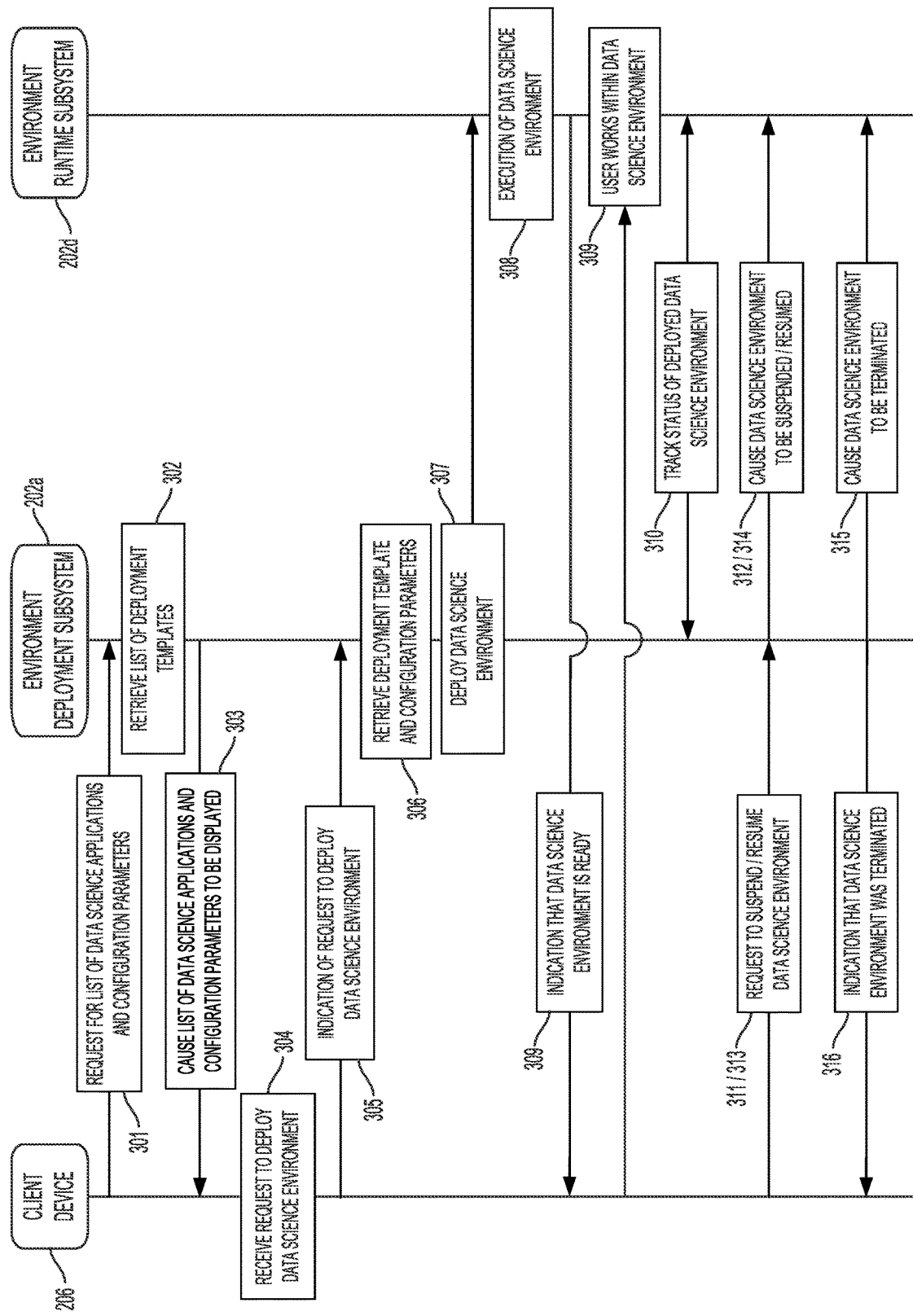
FIG. 3 depicts an example communication diagram for facilitating the deployment of a data science environment.

Turning now to FIG. 3, an example communication diagram is provided to illustrate communications that may be exchanged, and operations that may be performed, by some of the subsystems in FIG. 2 to configure and deploy a new data science environment. In particular, FIG. 3 illustrates example interactions involving the client device 206, the environment deployment subsystem 202a, and the environment runtime subsystem 202d. Further, the example interactions may take place within the context of the overall computing platform 102 shown in FIG. 1.

In the example of FIG. 3, a user may use client device 206 to access the software application hosted by the environment deployment subsystem 202a, which may take the form of a web-based application or mobile application, among other possibilities. As an initial step, the user may enter access credentials (e.g., a username and password) for logging in to the software application. In response, the environment deployment subsystem 202a may query the LDAP subsystem 202f shown in FIG. 2 to authenticate the login request. As part of a successful authentication, the environment deployment subsystem 202a may also receive, from the LDAP subsystem 202f, a set of permissions information for the user that governs the user's ability to access certain data within the computing platform 102.

At block 301 of the example communication diagram shown in FIG. 3, following a successful login to the software application 202a, the client device 206 may transmit a communication to the environment deployment subsystem 202a comprising a request for a list of the data science applications (and corresponding configuration options) that are available to the user. In some implementations, the client device 206 may transmit the request immediately upon receiving an indication of a successful login. Alternatively, the client device 206 might transmit the request after a user navigates to an interface for configuring a new data science environment. Other examples are possible as well.

At block 302, after receiving the communication sent by the client device 206 at block 301, the environment deployment subsystem 202a may retrieve a list of deployment templates that are available to the user (perhaps along with other data that defines the configuration options for the available deployment templates to the extent not included within the deployment templates themselves). As noted above, this function may take various forms. For instance, in at least some implementations, this function may involve calling an API of a first service supported by the environment deployment subsystem 202a that is tasked with retrieving a list of deployment templates that are available to a user (perhaps along with other data that defines the configuration options for the available deployment templates to the extent not included within the deployment templates themselves), which may then be used as a basis for determining the particular options to present to the user via the interface. In this respect, the first service may function to retrieve a global list of available deployment templates in some manner (which may depend on whether the deployment templates are maintained within the code repository or the database 202b), and may also function to update the global list of available deployment templates based on permissions information for the user (which may involve interaction with the LDAP subsystem 202f). Other examples are possible as well.

Further, in line with the discussion above, the communication sent by the client device 206 at block 301 may itself take the form of an API call that triggers the first service of the environment deployment subsystem 202a to be invoked, or alternatively, the communication sent by the client device 206 may trigger the environment deployment subsystem 202a to make a call to an internal API of the first service in order to invoke the first service. Other arrangements are also possible.

Further yet, although the example shown in FIG. 3 illustrates the environment deployment subsystem 202a retrieving the list of deployment templates based on a request received from the client device 206, other implementations are also possible. For instance, the environment deployment subsystem 202a might retrieve this information automatically after a successful user login, without receiving a separate request to do so from the client device 206. Other examples are also possible.

At block 303, based on the retrieved list of deployment templates, the environment deployment subsystem 202a may cause the software application to present the user with a graphical user interface that shows (i) a list of available data science applications that can be selected by the user and (ii) a set of configuration options that are available for a selected data science application (e.g., version options, computing resource allocation options, workspace options, etc.) and can be selected by the user. This function may take various forms. For instance, in at least some implementations, the first service that is tasked with retrieving the list of deployment templates available to the user may additionally be tasked with using the list of deployment templates (perhaps along with other data that defines the configuration options for the available deployment templates to the extent not included within the deployment templates themselves) as a basis for determining a list of data science applications that are available for selection by the user and then causing the interface of the software application to present that list of data science applications to the user along with available configuration options (e.g., version options, computing resource allocation options, workspace options, etc.) for whichever data science application is selected within the interface. Other examples are possible as well.

Figure 4A:
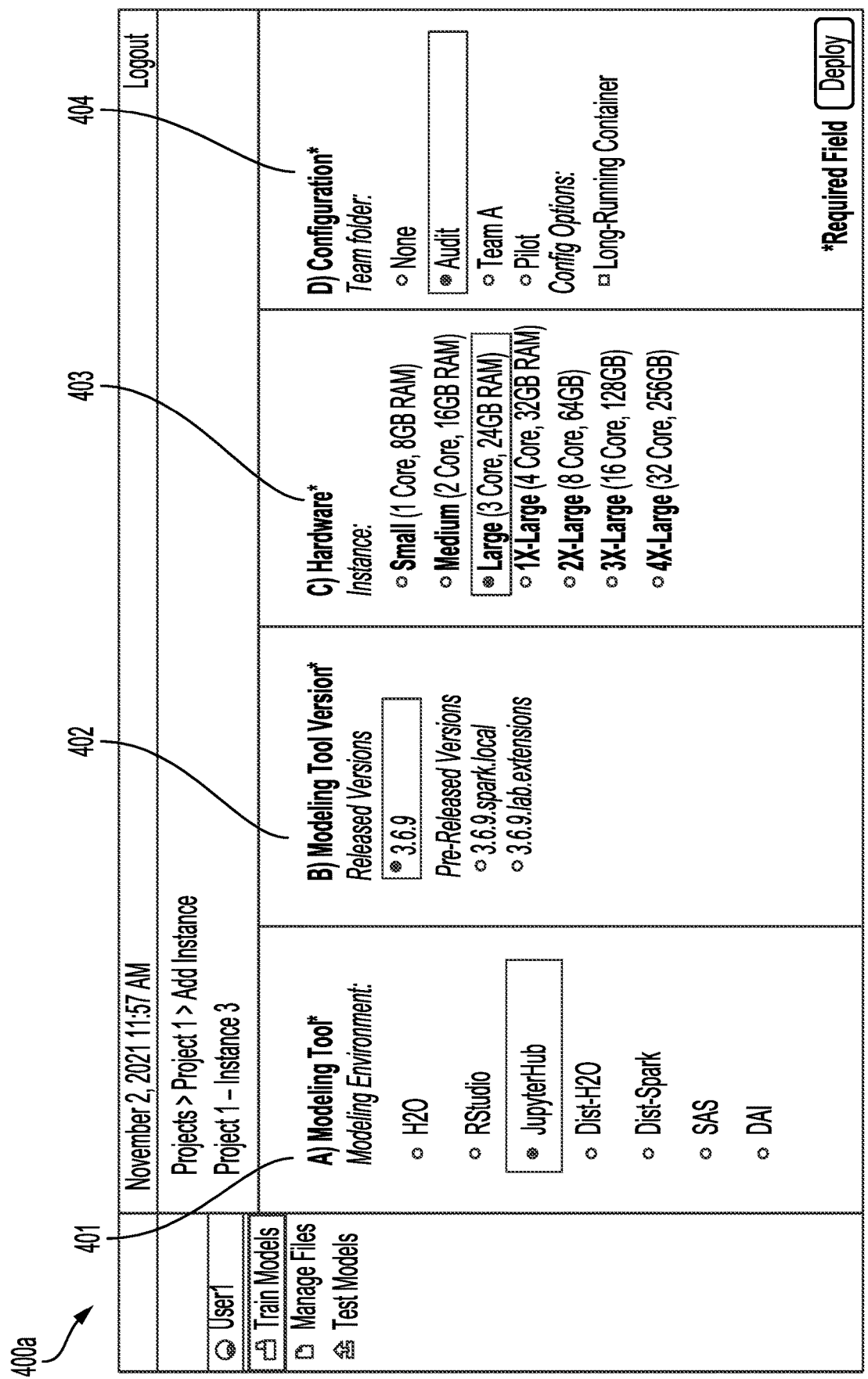
FIG. 4A depicts an example of a user interface for receiving inputs related to the deployment of a data science environment.

One possible example of an interface that may be provided by the environment deployment subsystem 202a can be seen in FIG. 4A, which illustrates an interface 400a of the software application that may be displayed by the client device 206 and may facilitate receiving inputs related to the deployment of a new data science environment. As shown in FIG. 4A, the interface 400a displays a series of columns that include selectable options. In the first column, a list of data science applications 401 is displayed, from which the user may select a given data science application. In this regard, the first column may be populated (e.g., by the first service) based on the list of deployment templates that were retrieved by the first service. For instance, the list of deployment templates may include at least one deployment template for each selectable option in list of data science applications 401. Thus, the selection of the JupyterHub application in the first column represents a selection of a JupyterHub deployment template, perhaps out of multiple available JupyterHub deployment templates.

In the second column, a list of version numbers 402 is displayed, indicating the available options for selecting a version number for each data science application in the first column. In this way, the second column contains a first set of user-defined configuration parameters from which a selection may be made to define a particular environment configuration for the new data science environment. As can be seen in FIG. 4A, the selection of JupyterHub in the first column causes the second column to be populated with configuration options (e.g., released and pre-release version numbers) that correspond to JupyterHub. The selection of a different data science application in the first column, such as RStudio, would result in a different set of version numbers that correspond to RStudio to be displayed in the second column.

Similarly, the third column in the interface 400a of FIG. 4A contains a list of selectable computing resource allocations 403 indicating the available options for provisioning the computing resources for each data science application in the first column. In this way, the third column contains a second set of user-defined configuration parameters from which a selection may be made to define a particular environment configuration for the new data science environment. As shown in FIG. 4A, the selection of JupyterHub in the first column causes the third column to be populated with computing resource allocation options that are available for use with JupyterHub. As with the second column, this list of computing resource allocation options may change based on the selected data science application, and thus selection of a different data science application in the first column may result in a different set of computing resource allocations to be displayed. For instance, the data science application Distributed H2O (Dist-H2O) may require a minimum computing resource allocation that is greater than even the largest option that was available for JupyterHub, and thus selecting Dist-H2O in the first column may cause a different list of hardware options to be displayed in the third column that correspond to Dist-H2O.

Turning to the fourth column in the interface 400a, a list of additional configuration options 404 is shown, including a list of selectable team folder options, which may represent a third set of user-defined configuration parameters from which a selection may be made to define a particular environment configuration for the new data science environment. As discussed above, the selection of a team folder may be used to define a shared workspace for the deployed data science environment within which certain other users (e.g., other team members) are permitted to collaborate with the user. Further, the selection of a team folder may also define the set of users who may receive notifications related to the deployment of the data science environment. In some implementations, as noted above, the selection of a team folder in the fourth column (or alternatively, the selection of no team folder) may provide part of the basis for which deployment template should be used to deploy the data science environment. The list of additional configuration options 404 also includes a selectable option to deploy the data science environment within a long-running container, which may provide for an extended run time for the data science environment before it is automatically terminated (which is described in further detail below). Other additional configuration options are also possible.

Returning to FIG. 3, at block 304, the client device 206 may receive a user request to deploy a new data science environment for a given data science application selected by the user (e.g., H2O, RStudio, JupyterHub, Distributed H2O, Distributed Spark, SAS Studio, or Driverless AI) using certain user-defined configuration parameters (e.g., a given version, a given computing resource allocation, a given workspace option, etc.). In this regard, the user request to deploy the data science environment may serve as a confirmation of the user's other inputs for the new data science environment, and may comprise a user selection of an "Deploy" button in the interface 400a shown in FIG. 4A, among other possibilities.

At block 305, the client device 206 may transmit a communication to the environment deployment subsystem 202a that comprises an indication of the user's request to deploy the data science environment, along with data indicating (i) the given data science application selected by the user and (ii) the user-defined configuration parameters selected by the user (e.g., a given version, a given computing resource allocation, a given workspace option, etc.).

At block 306, based on the information included in the communication sent by the client device 206 at block 305, the environment deployment subsystem 202a may select and retrieve a given deployment template for use in deploying the data science environment (e.g., a template for JupyterHub version 3.6.9). As discussed above, this function may take various forms. For instance, in at least some implementations, this function may involve calling an API of a second service supported by the environment deployment subsystem 202a that is tasked with determining which deployment template to use for a requested deployment of a new data science environment (e.g., based on the given data science application that has been selected and perhaps also one of the user-defined configuration parameters) then retrieving that deployment template in some manner (which may depend on whether the deployment templates are maintained within the code repository or the database 202b). Other examples are possible as well.

Further, along with retrieving the given deployment template for use in deploying the data science environment, the environment deployment subsystem 202a may also retrieve any additional configuration parameters that are to be used in conjunction with the given deployment template in order to define the particular environment configuration for deployment, such as a set of predefined configuration parameters that correspond to the given deployment template and/or a set of global configuration parameters. For instance, in at least some implementations, the second service that is tasked with selecting and retrieving a deployment template to use for a requested deployment of a new data science environment may additionally be tasked with retrieving any additional configuration parameters to use for the requested deployment (e.g., from the database 202b), such that calling the API of the second service may invoke this function as well.

Further yet, in line with the discussion above, the communication sent by the client device 206 at block 306 may itself take the form of an API call that triggers the second service of the environment deployment subsystem 202a to be invoked, or alternatively, the communication sent by the client device 206 may trigger the environment deployment subsystem 202a to make a call to an internal API of the second service in order to invoke the second service. Other arrangements are also possible.

At block 307, the environment deployment subsystem 202a may then deploy the new data science environment based on the given deployment template and a given set of configuration parameters, which may include a combination of user-defined configuration parameters (e.g., version, computing resource allocation, shared workspace, etc.) and additional configuration parameters that were retrieved along with the given deployment template (e.g., predefined configuration parameters corresponding to the given deployment template and/or global configuration parameters). This function may take various forms. For instance, in at least some implementations, this function may involve calling an API of a third service supported by the environment deployment subsystem 202a that is tasked with deploying a new data science environment based on a deployment template and a set of configuration parameters that is provided to the third service via its API (e.g., by the second service described above).

In this respect, as discussed above, the functions that are carried out by the third service in order to deploy the new data science environment may take various forms, examples of which may include (i) determining which of the one or more executable environment packages specified in the given deployment template to use for the deployment of the new data science environment, which may depend on which version of the given data science application was selected, and then retrieving that executable environment package (e.g., from the environment repository 202c), (ii) causing a certain allocation of computing resources to be provisioned for the deployment of the new data science environment, (iii) carrying out certain pre-deployment configuration operations, (iv) applying certain of the configuration parameters to the retrieved executable environment package in order to create a deployed data science environment that can be executed by the environment runtime subsystem 202d (e.g., a container or virtual machine comprising the data science environment) and can interact with other functional subsystems of the computing platform 102, and (v) carrying out certain post-deployment configuration operations, among other possibilities.

To illustrate blocks 305-307 with an example in the context of FIG. 4A, the environment deployment subsystem 202a may receive a communication comprising an indication of a user's request to deploy a new data science environment for JupyterHub using a version of 3.6.9, a "Large" computing resource allocation that comprises a 3-core processor with 24 GB of RAM, and a shared workspace that takes the form of a team folder called "Audit." Based on this communication, the environment deployment subsystem 202a may select and retrieve a given deployment template that defines a baseline environment configuration for version 3.6.9 of JupyterHub in a scenario where a shared workspace is to be utilized—which may comprise the only deployment template available for JupyterHub or may comprise one of multiple deployment templates available for JupyterHub. In turn, the environment deployment subsystem 202a may then deploy the new data science environment based on the given deployment template and a given set of configuration parameters, which may include the user-selected version of 3.6.9, the user-selected computing resource allocation of a 3-core processor with 24 GB of RAM, the user-selected "Audit" team folder, and then any additional configuration parameters that were retrieved along with the given deployment template (e.g., predefined configuration parameters corresponding to the given deployment template and/or global configuration parameters). Many other examples are possible as well.

At block 308, the deployed data science environment may begin executing within the environment runtime subsystem 202d. For example, if the deployed data science environment comprises a container that is created at block 307, then the environment runtime subsystem 202d may begin to run the container at block 308. In this respect, the deployed data science environment could begin executing within the environment runtime subsystem 202d upon deployment, or could begin executing at a later time in response to some trigger such as a user request, among other possibilities.

After the deployed data science environment has begun executing within the environment runtime subsystem 202d and is ready for use, a notification may then to be presented to the user that initiated the deployment of the data science environment (and perhaps one or more other users) in order to inform the user that the data science environment is ready for use. This notification may take various forms. As one possibility, the notification may take the form of an email that is sent to an email address of the user that initiated the deployment of the data science environment (and perhaps one or more other users). As another possibility, the notification may take the form of an indication that is presented the user that initiated the deployment of the data science environment (and perhaps one or more other users) via the interface of the disclosed software application. Other types of notifications are also possible.

At block 309, the user may use the client device 206 (or some other client device) to access the deployed data science environment and then work within the deployed data science environment to perform various tasks related to building data science models, as generally discussed above.

At block 310, after the data science environment begins executing within the environment runtime subsystem 202d, the environment deployment subsystem 202a may also begin tracking the status of the deployed data science environment. This function may take various forms. For instance, in at least some implementations, this function may involve calling an API of a fourth service supported by the environment deployment subsystem 202a that is tasked with tracking status of each deployed data science environment. In this respect, the fourth service may function to interact with the environment runtime subsystem 202d to obtain status information for a deployed data science environment and then store the status information in a database (e.g., the database 202b). As noted above, such status information may take any of various forms, examples of which may include a current run status of the deployed data science environment (e.g., active, suspended, terminated, etc.), a total amount of run time of the deployed data science environment, a remaining amount of run time in the lifetime of the deployed data science environment, and an indication of recent usage activity of the deployed data science environment, among other possibilities.

Figure 4B:
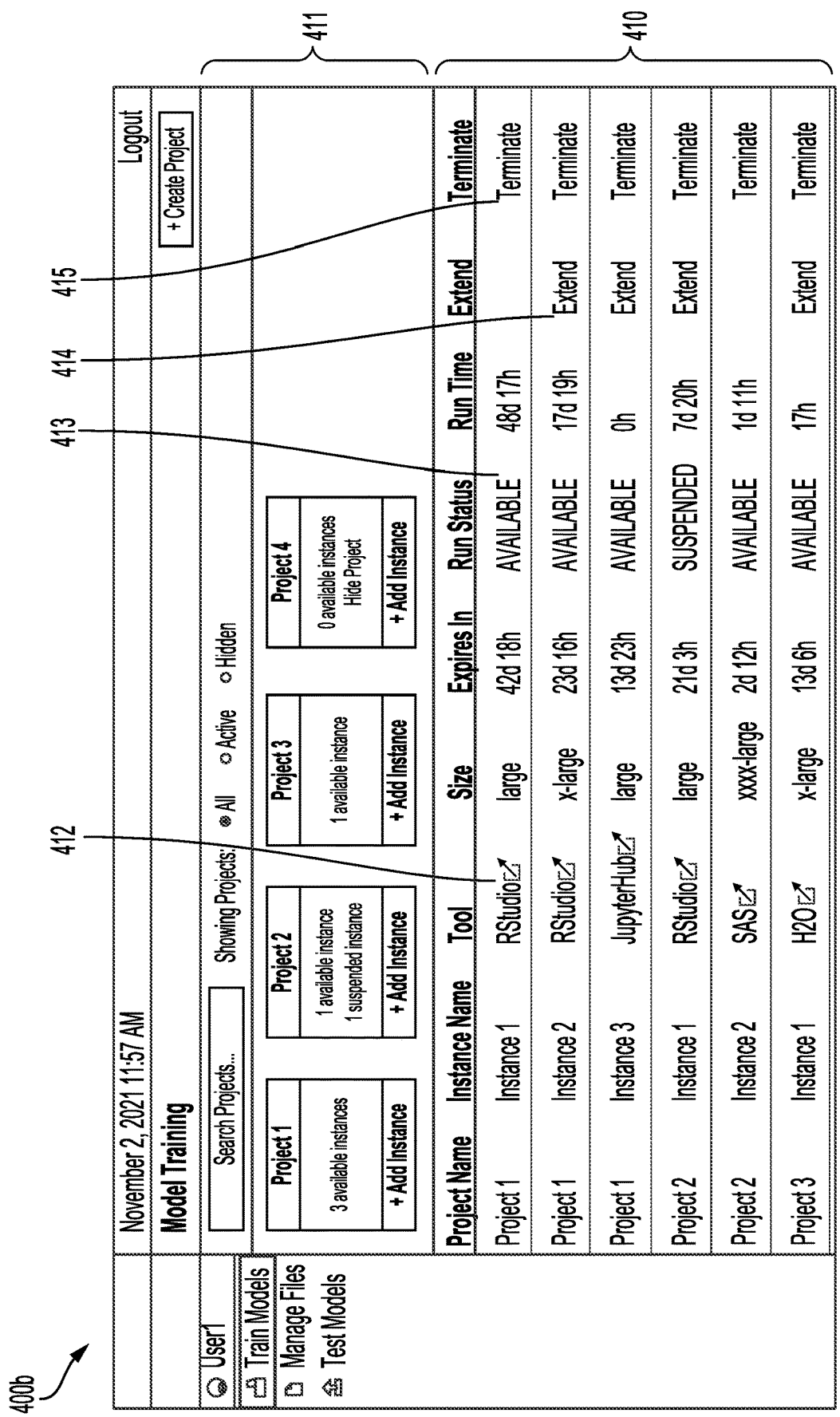
FIG. 4B depicts an example of a user interface for managing the deployment of data science environments.

To illustrate with an example, FIG. 4B illustrates another example interface 400b of the software application that may be displayed by the client device 206 to facilitate the management of multiple deployed data science environments. As shown in FIG. 4B, the interface 400b displays a list 410 that includes each data science environment that the user has deployed, along with status information and other metadata associated with each environment. Moving from left to right, the list 410 includes, for each environment, an associated Project Name and an Instance Name that the user may assign in order to organize and identify the deployed environments. In this regard, the interface 400b also displays a higher-level list 411 of the projects with which the deployed environments are associated, which a user may utilize to filter the environments shown in the list 410.

Further, the list 410 includes a "Tool" column that identifies which data science application was used to deploy each data science environment. For example, the first two environments listed may be deployed using RStudio, whereas the third environment in the list 411 may be a JupyterHub environment, such as the example JupyterHub environment that was discussed above with respect to FIG. 4A, and so on. Moreover, the indication of each data science application in the "Tool" column of the list 411 may be selectable (e.g., via a touch input, a mouse click, etc.) to directly access the deployed data science environment within the indicated data science application. For instance, selecting the RStudio icon 412 for the first environment in the list 410 may launch the RStudio data science application (e.g., in a separate window), which in turn may present the user with an RStudio login screen. In this regard, the environment runtime subsystem 202d may interact with the LDAP subsystem 202f shown in FIG. 2 to authenticate the user and verify that they have the appropriate permissions to access the selected RStudio environment (e.g., that the user is the creator of the environment, or an authorized collaborator).

Further yet, the list 410 includes a "Size" column that provides a shorthand indication of the computing resources that were allocated to each data science environment. For example, the size indications shown in FIG. 4B (e.g., large, x-large, etc.) may correspond to the computing resource allocation options shown in FIG. 4A.

Still further, the list 410 includes an "Expires In" column that indicates the time until the data science application will be automatically terminated (e.g., based on a lifecycle policy) if the user does not extend the run time of the environment (if applicable). For instance, each data science environment may be initially deployed for a default period of time. The default period of time may be based on the size of the computing resources that are selected such that environments utilizing a greater allocation of resources have a shorter default run time, although other implementations are also possible.

Still further, the list 410 includes a "Run Status" column that indicates the current status of each deployed environment. As shown in FIG. 4B, one of the environments in the list is in a "SUSPENDED" state, while each of the other five environments are indicated as "AVAILABLE" (e.g., active and not suspended). Additionally, the indication of the current status in the "Run Status" column may be selectable (e.g., via a touch input, a mouse click, etc.) by the user to manually alter the current status of the environment. For instance, selecting the AVAILABLE icon 413 for the first environment in the list 410 may cause a menu or similar screen to be presented whereby the user may input a request to suspend the first environment in the list 410. Similarly, selecting the SUSPENDED icon for the fourth environment in the list 410 may cause a menu or similar screen to be presented whereby the user may input a request to resume fourth environment in the list 410. Other examples are also possible.

Still further, the list 410 includes a "Run Time" column that provides an indication of the total run time of each environment from the time of initial deployment, as well as an "Extend" column that may provide the user with the option to extend the run time in some situations. For instance, each indication that appears in the "Extend" column may be selectable (e.g., via a touch input, a mouse click, etc.) by the user to extend the run time of the corresponding environment. Thus, selecting the "Extend" icon 414 for the second environment in the list 410 may cause a menu or similar screen to be presented whereby the user may input a request to extend the run time of the second environment in the list 410. However, as can be seen in FIG. 4B, an option to extend the run time is not available for all environments. An option to extend may be unavailable for various reasons. As one possibility, there may be a limit to the number of times an environment's run time may be extended. The first environment in the list 410 may have already been extended the maximum number of times (e.g., three times), and thus the option to extend does not appear for this environment in FIG. 4B. As another possibility, data science environments that are deployed with very large computing resource allocations may not be eligible for any extension of run time. Thus, the fifth environment in the list 410, which is indicated as having a "xxxx-large" computing resource size, may similarly have no selectable option to extend its run time. A given environment may be restricted from extending its run time for other reasons as well.

Still further, the list 410 includes a "Terminate" column that provides an indication that is selectable (e.g., via a touch input, a mouse click, etc.), for each data science environment in the list 410, to manually terminate the environment. Thus, selecting the Terminate icon 415 for the first environment in the list 410 may cause a menu or similar screen to be presented whereby the user may input a request to terminate the first environment in the list 410.

Based on the above, the interface 400b may advantageously provide a single, centralized location from which a user can view, manage, and directly access all of their deployed data science environments.

Returning to FIG. 3, while tracking the status of the deployed data science environment at block 310, the environment deployment subsystem 202a may optionally cause status updates for the deployed data science environment to be provided to certain users (e.g., the user that initiated deployment of a data science environment and perhaps also other users that have been subscribed to status updates for a data science environment). This function may take various forms. For instance, in at least some implementations, the fourth service that is tasked with tracking the status of each deployed data science environment may additionally use the obtained status information for a deployed data science environment as a basis for causing status updates to be provided to users in the form of indications presented within the interface of the disclosed software application and/or emails, among other possibilities.

Additionally yet, while tracking the status of the deployed data science environment, the environment deployment subsystem 202a may optionally evaluate one or more lifecycle policies for the deployed data science environment. For instance, as one possibility, the fourth service that is tasked with tracking the status of each deployed data science environment may additionally use certain of the obtained status information for a deployed data science environment as a basis for evaluating a lifecycle policy governing whether to automatically suspend the deployed data science environment, and then if it is determined that such a lifecycle policy is satisfied, the fourth service may then call an API of another service supported by the environment deployment subsystem 202a that is tasked with suspending a deployed data science environment (which is described in further detail below). In this respect, the lifecycle policy governing whether to automatically suspend the deployed data science environment may take any of various forms. As one possible example, the lifecycle policy may comprise a rule that evaluates recent user activity with respect to the deployed data science environment. For instance, the lifecycle policy may be satisfied if a period of user inactivity (e.g., a time period during which a user does not login to the data science environment) exceeds a given threshold time period.

As another possibility, the fourth service that is tasked with tracking the status of each deployed data science environment may additionally use certain of the obtained status information for a deployed data science environment as a basis for evaluating a lifecycle policy governing whether to automatically terminate the deployed data science environment, and then if it is determined that such a lifecycle policy is satisfied, the fourth service may then call an API of another service supported by the environment deployment subsystem 202a that is tasked with terminating a deployed data science environment (which is described in further detail below). In this respect, the lifecycle policy governing whether to automatically terminate the deployed data science environment may take any of various forms, and as one possible example, may comprise a rule that evaluates whether a total amount of run time of the deployed data science environment (e.g., the run time shown in FIG. 4B) has reached a threshold amount of run time for the deployed data science environment.

While tracking the status of the deployed data science environment, the environment deployment subsystem 202a may evaluate other types of lifecycle policies and/or perform other functions based on the status of the deployed data science environment as well.

While the deployed data science environment is being executed within the environment runtime subsystem 202d, the environment deployment subsystem 202a may also enable the user to temporarily suspend the deployed data science environment in order to avoid the deployed data science environment from unnecessarily running during a period of time when the user does not expect to be working in the deployed data science environment (e.g., over a weekend). For instance, as shown in FIG. 4B, the interface 400b of the software application hosted by the environment deployment subsystem 202a may present the user with a selectable option to temporarily suspend a deployed data science environment.

At block 311, while accessing the interface of the software application hosted by the environment deployment subsystem 202a via the client device 206, the user may select such an option to temporarily suspend the deployed data science environment (e.g., the selectable indication 413), which may cause the client device 206 to transmit a communication to the environment deployment subsystem 202a comprising a request to temporarily suspend the deployed data science environment.

At block 312, based on receiving the communication sent by the client device 206 at block 311, the environment deployment subsystem 202a may cause the environment runtime subsystem 202d to temporarily suspend the deployed data science environment, which may involve scaling down the deployed data science environment and disabling access to it by external clients such as client device 206. This function may take various forms. For instance, in at least some implementations, this function may involve calling an API of a fifth service supported by the environment deployment subsystem 202a that is tasked with causing the environment runtime subsystem 202d to suspend a deployed data science environment. (As noted above, this same service may also be called by the fourth service to automatically suspend a deployed data science environment in accordance with a lifecycle policy). In this respect, the fifth service may function to interact with the environment runtime subsystem 202d in a manner that causes the deployed data science environment to be scaled down and have its external access disabled. Further, the fifth service may also function to store a current operation configuration for the deployed data science environment in a database (e.g., the database 202b).

In a scenario where the deployed data science environment has been temporarily suspended, the environment deployment subsystem 202a may then enable the user to resume the deployed data science environment. For instance, as shown in FIG. 4B, the interface 400b of the software application hosted by the environment deployment subsystem 202a may present the user with a selectable option to resume a deployed data science environment that has been suspended.

At block 313, while accessing the interface of the software application hosted by the environment deployment subsystem 202a via the client device 206, the user may select such an option to resume the deployed data science environment, which may cause the client device 206 to transmit a communication to the environment deployment subsystem 202a comprising a request to resume the deployed data science environment.

At block 314, based on receiving the communication sent by the client device 206 at block 312, the environment deployment subsystem 202a may cause the environment runtime subsystem 202d to resume the deployed data science environment, which may involve scaling up the deployed data science environment and re-enabling access to it by external clients such as client device 206. This function may take various forms. For instance, in at least some implementations, the fifth service that is tasked with causing the environment runtime subsystem 202d to suspend a deployed data science environment may also be tasked with causing the environment runtime subsystem 202d to resume a deployed data science environment that has previously been suspended, in which case this function may involve calling the API of the fifth service.

In line with the discussion above, the communications sent by the client device 206 at blocks 311 and 313 may each take the form of an API call that triggers the fifth service of the environment deployment subsystem 202a to be invoked, or alternatively, the communications sent by the client device 206 at blocks 311 and 313 may trigger the environment deployment subsystem 202a to make a call to an internal API of the fifth service in order to invoke the fifth service. Other arrangements are also possible.

Further, along with providing this functionality for suspending and resuming the deployed data science environment, the environment deployment subsystem 202a may also provide functionality for retrying these operations in a scenario where a request to suspend or resume the deployed data science environment is unsuccessful. For instance, if the environment deployment subsystem 202a detects that the environment runtime subsystem 202d has failed to implement a suspend or resume operation, the environment deployment subsystem 202a may cause the interface of the software application to present the user with an option to retry the suspend or resume operation, and if the user selects such a retry option, functionality similar to that described at blocks 311-312 (for a suspend operation) or blocks 313-314 (for a resume operation) may be repeated in order to retry the suspend or resume operation that was initially unsuccessful.

As the data science environment continues to execute within the environment runtime subsystem 202d, the environment deployment subsystem 202a may continue to track the status of the deployed data science environment and evaluate the one or more lifecycle policies for the deployed data science environment (e.g., by invoking the fourth service described above). Based on that evaluation, the environment deployment subsystem 202a may at some point determine that the deployed data science environment should be terminated (e.g., when the deployed data science environment reaches the end of its designated run time). In response to making such a determination, at block 315, the environment deployment subsystem 202a may cause the environment runtime subsystem 202d to terminate the deployed data science environment. This function may take various forms. For instance, in at least some implementations, this function may involve calling an API of a sixth service supported by the environment deployment subsystem 202a that is tasked with causing the environment runtime subsystem 202d to terminate a deployed data science environment. In this respect, the sixth service (which as noted above may be called by the fourth service) may function to interact with the environment runtime subsystem 202d in a manner that causes the deployed data science environment to be terminated.

At block 316, after the deployed data science environment is terminated, the environment deployment subsystem 202a may also cause a notification to be presented to the user that initiated the deployment of the data science environment (and perhaps one or more other users) to inform the user that the data science environment has been terminated. This function may take various forms. For instance, in at least some implementations, the fourth service that is tasked with tracking the status of each deployed data science environment may detect that the data science environment has been terminated and then cause a termination notification to be provided to the user that initiated the deployment of the data science environment (and perhaps one or more other users) in the form of a notification presented within the interface of the disclosed software application and/or an email, among other possibilities. Thereafter, the terminated data science environment may no longer be included within the list of deployed data science environments shown in the interface of the disclosed software application.

In some implementations, prior to termination of the deployed data science environment, the environment deployment subsystem 202a may also enable the user to extend the lifetime of the deployed data science environment beyond a threshold amount of run time for deployed data science environments. For instance, the interface of the software application hosted by the environment deployment subsystem 202a may present the user with a selectable option (e.g., the selectable indication 414) to extend the lifetime of the deployed data science environment, and if the user selects such an option to extend the deployed data science environment, the client device 206 may then transmit a communication to the environment deployment subsystem 202a comprising a request to extend the deployed data science environment. In turn, the environment deployment subsystem 202a may account for this extension when evaluating the one or more lifecycle policies for the deployed data science environment. In practice, the environment deployment subsystem 202a may also impose a limit on how long the lifetime of the deployed data science environment can be extended (e.g., by limiting the number of extensions that can be requested by the user).

Further, instead of terminating the deployed data science environment automatically based on a lifecycle policy, the environment deployment subsystem 202a may enable the user to terminate the deployed data science environment in a similar manner to how the user may suspend the deployed data science environment. For instance, the interface of the software application hosted by the environment deployment subsystem 202a may present the user with a selectable option (e.g., the selectable indication 415) to terminate the deployed data science environment prior to the end of its default lifetime, and if the user selects such an option to terminate the deployed data science environment, the client device 206 may then transmit a communication to the environment deployment subsystem 202a comprising a request to terminate the deployed data science environment. In turn, the environment deployment subsystem 202a may cause the environment runtime subsystem 202d to terminate the deployed data science environment (e.g., by invoking the sixth service described above that is tasked with terminating a deployed data science environment).

The functions that may be carried out by the environment deployment subsystem 202a, the client device 206, and/or the environment runtime subsystem 202d in order to configure, deploy, track, and manage data science environments in accordance with the disclosed technology may take various other forms as well.

Figure 5:
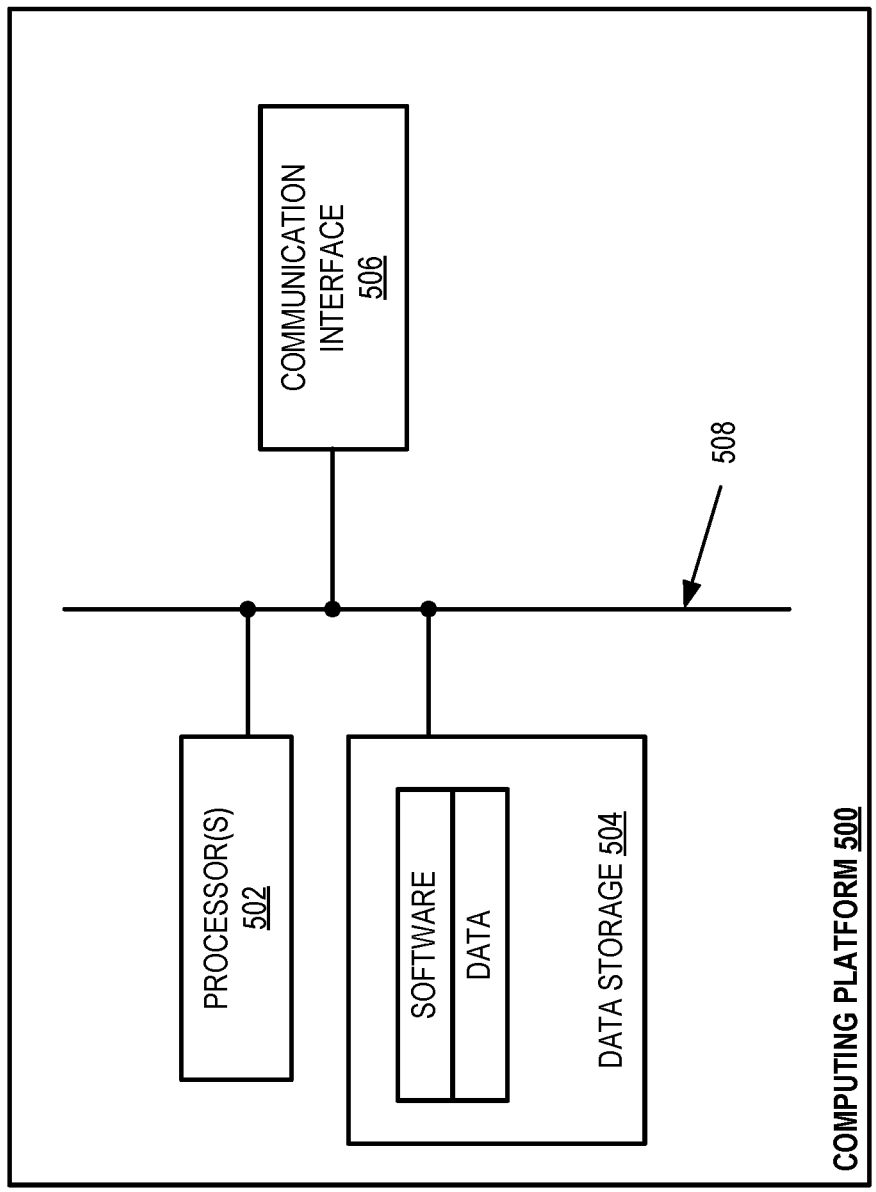
FIG. 5 is a simplified block diagram that illustrates some structural components that may be included in an example computing platform.

Turning now to FIG. 5, a simplified block diagram is provided to illustrate some structural components that may be included in an example computing platform 500. For example, computing platform 500 could serve as the computing platform 102 shown in FIG. 1 and may be configured to carry out any of the various subsystem functions disclosed herein—including but not limited to the functions performed by the software application 202a in the example communication diagram described with reference to FIG. 3. At a high level, computing platform 500 may generally comprise any one or more computer systems (e.g., one or more servers) that collectively include at least a processor 502, data storage 504, and a communication interface 506, all of which may be communicatively linked by a communication link 508 that may take the form of a system bus, a communication network such as a public, private, or hybrid cloud, or some other connection mechanism. Each of these components may take various forms.

For instance, processor 502 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 502 could comprise processing components that are distributed across a plurality of physical computing devices connected via a network, such as a computing cluster of a public, private, or hybrid cloud.

In turn, data storage 504 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 504 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 5, data storage 504 may be capable of storing both (i) program instructions that are executable by processor 502 such that the computing platform 500 is configured to perform any of the various functions disclosed herein (including but not limited to any the functions performed by the software application 202a described with reference to FIG. 3), and (ii) data that may be received, derived, or otherwise stored by computing platform 500.

Communication interface 506 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication.

It should be understood that computing platform 500 is one example of a computing platform that may be used with the embodiments described herein. Numerous other arrangements are possible and contemplated herein. For instance, other computing systems may include additional components not pictured and/or more or less of the pictured components.

Figure 6:
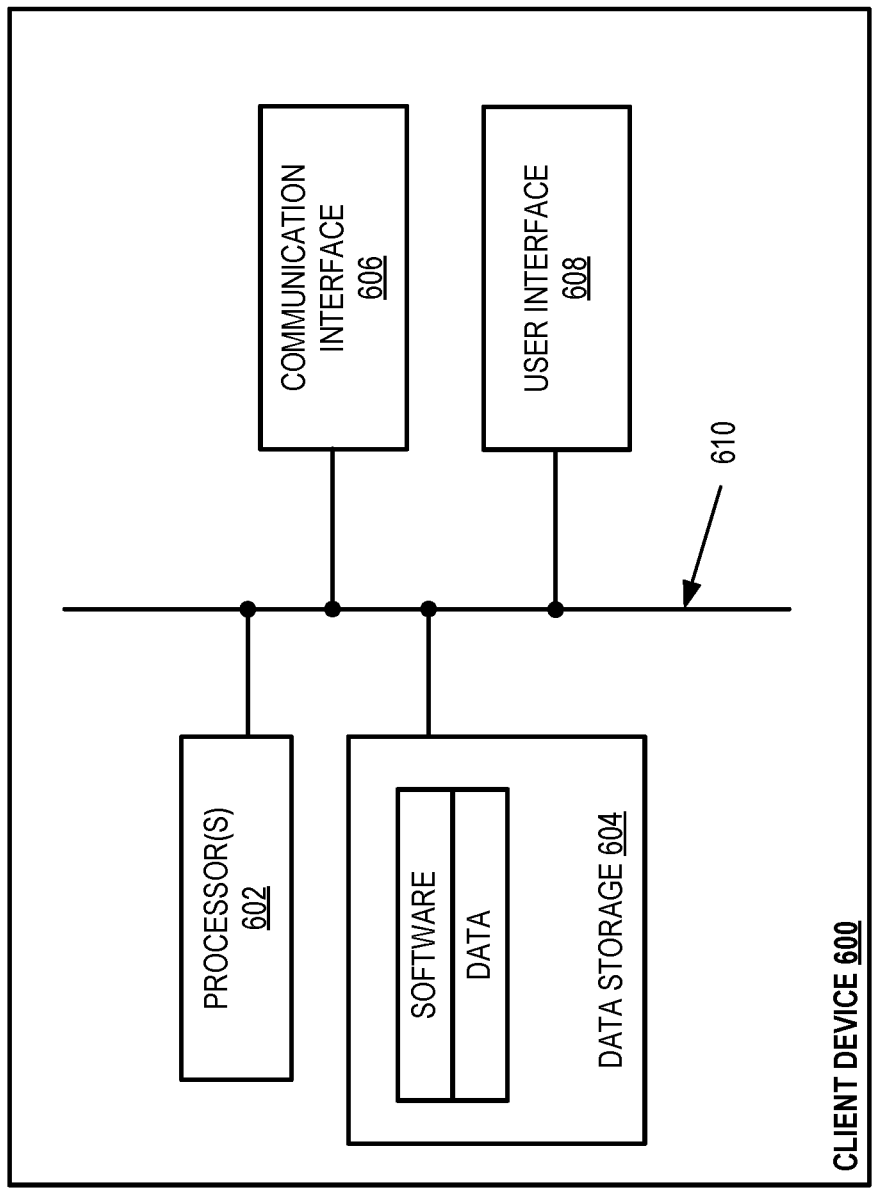
FIG. 6 is a simplified block diagram that illustrates some structural components that may be included in an example client device.

Turning now to FIG. 6, a simplified block diagram is provided to illustrate some structural components that may be included in an example client device 600. For example, client device 600 could serve as the client device 206 shown in FIG. 2 and may be configured to carry out any of the various subsystem functions disclosed herein—including but not limited to the functions performed by the client device 206 in the example communication diagram described with reference to FIG. 3. At a high level, client device 600 may generally comprise a processor 602, data storage 604, a communication interface 606, and a user interface 608, all of which may be communicatively linked by a communication link 610 that may take the form of a system bus, or some other connection mechanism. Each of these components may take various forms.

For instance, processor 602 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 602 could comprise processing components that are distributed across a plurality of physical computing devices connected via a network, such as a computing cluster of a public, private, or hybrid cloud.

In turn, data storage 604 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 604 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 6, data storage 604 may be capable of storing both (i) program instructions that are executable by processor 602 such that the client device 600 is configured to perform any of the various functions disclosed herein (including but not limited to any the functions performed by the client device 206 described with reference to FIG. 3), and (ii) data that may be received, derived, or otherwise stored by client device 600.

Communication interface 606 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication.

The client device 600 may additionally include a user interface 608 for connecting to user-interface components that facilitate user interaction with the client device 600, such as a keyboard, a mouse, a trackpad, a display screen, a touch-sensitive interface, a stylus, a virtual-reality headset, and/or speakers, among other possibilities.

It should be understood that client device 600 is one example of a client device that may be used with the embodiments described herein. Numerous other arrangements are possible and contemplated herein.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computing platform comprising:
a network interface for communicating over at least one data network;
at least one processor;
at least one non-transitory computer-readable medium; and program instructions stored on the at least one non-transitory computer-readable medium that are executable by the at least one processor such that the computing platform is configured to:
cause a client device associated with a user to display an interface for deploying a new data science environment, wherein the interface presents the user with (i) a list of data science applications and (ii) a set of user-defined configuration parameters corresponding to at least one data science application in the list;
receive, from the client device, data indicating (i) a user selection of a given data science application from the list and (ii) a user selection of one or more user-defined configuration parameters from the set of user-defined configuration parameters;
based at least on the received data indicating the user selection of the given data science application, determine a deployment template for use in deploying the new data science environment, wherein the deployment template comprises data specifying (i) an executable environment package and (ii) a set of predefined configuration parameters for use in deploying the new data science environment; and
use the executable environment package, the set of predefined configuration parameters, and the one or more user-defined configuration parameters to deploy the new data science environment.

2. The computing platform of claim 1, wherein the one or more user-defined configuration parameters comprise a computing resource allocation to use for deploying the new data science environment.

3. The computing platform of claim 1, further comprising program instructions stored on the non-transitory computer-readable medium that are executable by the at least one processor such that the computing platform is configured to:
determine a set of user permissions assigned to the user, wherein the list of data science applications that is presented to the user is defined based on the set of user permissions assigned to the user.

4. The computing platform of claim 1, wherein the user is associated with a set of user access credentials, and wherein the program instructions that are executable by the at least one processor such that the computing platform is configured to use the executable environment package, the set of predefined configuration parameters, and the one or more user-defined configuration parameters to deploy the new data science environment comprise program instructions that are executable by the at least one processor such that the computing platform is configured to deploy the new data science environment such that the set of user access credentials is required to access the new data science environment.

5. The computing platform of claim 1, further comprising program instructions stored on the non-transitory computer-readable medium that are executable by the at least one processor such that the computing platform is configured to:
track a deployment status of the new data science environment; and
while tracking the deployment status of the new data science environment, cause an indication of the deployment status of the new data science environment to be displayed at the client device.

6. The computing platform of claim 5, wherein the program instructions that are executable by the at least one processor such that the computing platform is configured to track the deployment status of the new data science environment comprise program instructions that are executable by the at least one processor such that the computing platform is configured to monitor a lifecycle policy of the new data science environment.

7. The computing platform of claim 1, further comprising program instructions stored on the non-transitory computer-readable medium that are executable by the at least one processor such that the computing platform is configured to:
based on a lifecycle policy for the new data science environment, automatically terminate the new data science environment.

8. The computing platform of claim 1, wherein the executable environment package comprises (i) executable program code for a given version of the data science application and (ii) one or more data objects that facilitate deployment of the new data science environment using the given version of the given data science application.

9. A non-transitory computer-readable medium, wherein the non-transitory computer-readable medium is provisioned with program instructions that, when executed by at least one processor, cause a computing platform to:
cause a client device associated with a user to display an interface for deploying a new data science environment, wherein the interface presents the user with (i) a list of data science applications and (ii) a set of user-defined configuration parameters corresponding to at least one data science application in the list;
receive, from the client device, data indicating (i) a user selection of a given data science application from the list and (ii) a user selection of one or more user-defined configuration parameters from the set of user-defined configuration parameters;
based at least on the received data indicating the user selection of the given data science application, determine a deployment template for use in deploying the new data science environment, wherein the deployment template comprises data specifying (i) an executable environment package and (ii) a set of predefined configuration parameters for use in deploying the new data science environment; and
use the executable environment package, the set of predefined configuration parameters, and the one or more user-defined configuration parameters to deploy the new data science environment.

10. The non-transitory computer-readable medium of claim 9, wherein the one or more user-defined configuration parameters comprise a computing resource allocation to use for deploying the new data science environment.

11. The non-transitory computer-readable medium of claim 9, wherein the non-transitory computer-readable medium is also provisioned with program instructions that, when executed by at least one processor, cause the computing platform to:
determine a set of user permissions assigned to the user, wherein the list of data science applications that is presented to the user is defined based on the set of user permissions assigned to the user.

12. The non-transitory computer-readable medium of claim 9, wherein the user is associated with a set of user access credentials, and wherein the program instructions that, when executed by at least one processor, cause the computing platform to use the executable environment package, the set of predefined configuration parameters, and the one or more user-defined configuration parameters to deploy the new data science environment comprise program instructions that, when executed by at least one processor, cause the computing platform to deploy the new data science environment such that the set of user access credentials is required to access the new data science environment.

13. The non-transitory computer-readable medium of claim 9, wherein the non-transitory computer-readable medium is also provisioned with program instructions that, when executed by at least one processor, cause the computing platform to:
- track a deployment status of the new data science environment; and
- while tracking the deployment status of the new data science environment, cause an indication of the deployment status of the new data science environment to be displayed at the client device.

14. The non-transitory computer-readable medium of claim 13, wherein the program instructions that, when executed by at least one processor, cause the computing platform to track the deployment status of the new data science environment comprise program instructions that, when executed by at least one processor, cause the computing platform to monitor a lifecycle policy of the new data science environment.

15. The non-transitory computer-readable medium of claim 9, wherein the non-transitory computer-readable medium is also provisioned with program instructions that, when executed by at least one processor, cause the computing platform to:
- based on a lifecycle policy for the new data science environment, automatically terminate the new data science environment.

16. The non-transitory computer-readable medium of claim 9, wherein the executable environment package comprises (i) executable program code for a given version of the data science application and (ii) one or more data objects that facilitate deployment of the new data science environment using the given version of the given data science application.

17. A method carried out by a computing platform, the method comprising:
- causing a client device associated with a user to display an interface for deploying a new data science environment, wherein the interface presents the user with (i) a list of data science applications and (ii) a set of user-defined configuration parameters corresponding to at least one data science application in the list;
- receiving, from the client device, data indicating (i) a user selection of a given data science application from the list and (ii) a user selection of one or more user-defined configuration parameters from the set of user-defined configuration parameters;
- based at least on the received data indicating the user selection of the given data science application, determining a deployment template for use in deploying the new data science environment, wherein the deployment template comprises data specifying (i) an executable environment package and (ii) a set of predefined configuration parameters for use in deploying the new data science environment; and
- using the executable environment package, the set of predefined configuration parameters, and the one or more user-defined configuration parameters to deploy the new data science environment.

18. The method of claim 17, wherein the one or more user-defined configuration parameters comprises a computing resource allocation to use for deploying the new data science environment.

19. The method of claim 17, wherein the user is associated with a set of user access credentials, and wherein using the executable environment package, the set of predefined configuration parameters, and the one or more user-defined configuration parameters to deploy the new data science environment comprises deploying the new data science environment such that the set of user access credentials is required to access the new data science environment.

20. The method of claim 17, further comprising:
- based on a lifecycle policy for the new data science environment, automatically terminating the new data science environment.

\* \* \* \* \*